US008125656B2

(12) United States Patent
Ikedo et al.

(10) Patent No.: US 8,125,656 B2
(45) Date of Patent: Feb. 28, 2012

(54) LABEL DATA CREATING APPARATUS, LABEL DATA CREATING METHOD, AND COMPUTER PROGRAM PRODUCT

(75) Inventors: Tatsuhiro Ikedo, Ena (JP); Motonori Tanaka, Nagoya (JP); Mikitoshi Suzuki, Hazu-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 775 days.

(21) Appl. No.: 12/286,922

(22) Filed: Oct. 3, 2008

(65) Prior Publication Data

US 2009/0103123 A1 Apr. 23, 2009

(30) Foreign Application Priority Data

Oct. 4, 2007 (JP) ................................ 2007-260557

(51) Int. Cl.
*G06K 15/00* (2006.01)
*G03G 15/00* (2006.01)

(52) U.S. Cl. ........ 358/1.12; 358/1.18; 399/81; 715/200; 715/243; 715/244; 715/245; 715/252

(58) Field of Classification Search ................ 358/1.12, 358/1.18; 399/81; 715/200, 243, 244, 245, 715/252
See application file for complete search history.

(56) References Cited

U.S. PATENT DOCUMENTS

| | | | | |
|---|---|---|---|---|
| 6,195,668 | B1 | 2/2001 | Toyosawa et al. | |
| 7,978,363 | B2 * | 7/2011 | Takayama | 358/1.18 |
| 2004/0208682 | A1 | 10/2004 | Akaiwa et al. | |
| 2004/0218216 | A1 * | 11/2004 | Ito et al. | 358/1.18 |
| 2007/0283249 | A1 | 12/2007 | Nose et al. | |

FOREIGN PATENT DOCUMENTS

| | | | |
|---|---|---|---|
| EP | 0737587 | A2 | 10/1996 |
| EP | 0760291 | A2 | 3/1997 |
| EP | 0782094 | A2 | 7/1997 |
| EP | 1420348 | A1 | 5/2004 |
| EP | 1973033 | A2 | 9/2008 |
| GB | 2314956 | A | 1/1998 |
| JP | 05-298465 | | 11/1993 |
| JP | 2006099254 | | 4/2006 |
| JP | 2006-202112 | | 8/2006 |
| JP | 2007-004676 | | 1/2007 |
| JP | 2007-036327 | | 2/2007 |

* cited by examiner

*Primary Examiner* — Twyler Haskins
*Assistant Examiner* — Fred Guillermety
(74) *Attorney, Agent, or Firm* — Day Pitney LLP

(57) ABSTRACT

In a case wherein a rolled sheet loaded in a tape printer is a non-fixed length rolled sheet, the CPU of the computer device displays a layout edit window which is set to a free length print mode on a display screen of a display. If the free length/fixed length switch button is clicked with a mouse for setting to a fixed length print mode, the CPU displays the layout edit window which is set to the fixed length print mode on the display screen of the display.

21 Claims, 18 Drawing Sheets

FIG. 9

731

| SHEET DISCRIMINATION SENSOR | ROLL SHEET TYPE |
|---|---|
| 110100 | 12mm NON-FIXED LENGTH |
| 110101 | 17mm NON-FIXED LENGTH |
| 110110 | 29mm NON-FIXED LENGTH |
| 110111 | 38mm NON-FIXED LENGTH |
| 111000 | 62mm NON-FIXED LENGTH |
| 111001 | 12mm DIE-CUT1 |
| 111010 | 29mm DIE-CUT1 |
| 111011 | 38mm DIE-CUT1 |
| 111100 | 62mm DIE-CUT1 |
| • | • |
| • | • |
| • | • |

FIG. 10

732

| DIE-CUT TYPE | WIDTH × LENGTH |
|---|---|
| 12mm DIE-CUT1 | 12mm × 54mm |
| 12mm DIE-CUT2 | 12mm × 90mm |
| 17mm DIE-CUT1 | 17mm × 54mm |
| 17mm DIE-CUT2 | 17mm × 90mm |
| 29mm DIE-CUT1 | 29mm × 90mm |
| 38mm DIE-CUT1 | 38mm × 90mm |
| 62mm DIE-CUT1 | 62mm × 29mm |
| 62mm DIE-CUT2 | 62mm × 100mm |
| • | • |
| • | • |
| • | • |

LABEL DATA CREATING APPARATUS, LABEL DATA CREATING METHOD, AND COMPUTER PROGRAM PRODUCT

CROSS-REFERENCE TO RELATED APPLICATIONS

The present application claims priority from Japanese Patent Application No. 2007-260557, filed on Oct. 4, 2007, the disclosure of which is hereby incorporated by reference.

TECHNICAL FIELD

The disclosure relates to a label data creating apparatus, a label data creating method, and a computer program product for creating and editing print data to be printed on a long print medium.

BACKGROUND

Conventionally, various kinds of technologies have been suggested for creating and editing print data to be printed on a print medium such as a long tape or a rolled sheet or the like. For instance, in one type of label data creating apparatus, a display screen of a display is divided into an upper portion and a lower portion. The upper portion displays a tape display area and the lower portion displays a data file display area. This apparatus is configured so as to display a virtual tape on the upper tape display area. This virtual tape indicates frame information according to which a template indicating assignment of the label data in the print area of the print tape is arranged (for example, Japanese Unexamined Patent Publication No.2006-99254).

However, with the configuration disclosed in the above-described Japanese Unexamined Patent Publication No. 2006-99254, the virtual tape is displayed extending up to one side edge portion of the tape display area. To find out the size of this virtual tape, a user must read the graduations on a ruler displayed at the other side edge portion of the tape display area. This makes it difficult to find out the size of the virtual tape at a first glance. Also, it is impossible to know whether the print area is set to a free length or a fixed length.

SUMMARY

The present disclosure has been worked out in view of the above-described problems, and an object thereof is to provide a label data creating apparatus, a label data creating method and a computer program product which allow a user to instantly find out the size of a print medium, and at the same time, allow a user to instantly find out whether the print area of the print medium is set to a free length or a fixed length.

To achieve the purpose of the disclosure, there is provided a label data creating apparatus comprising: a display having a display screen; a layout display unit that displays a layout of a long print medium onto which print data will be printed, on the display screen of the display, in a vertical direction or horizontal direction corresponding to a vertical writing or horizontal writing of label data to be printed on the print medium; and a size display unit that displays a size of the print medium at an exterior side of a tip edge portion of the layout in a conveying direction.

According to the label data creating apparatus, the layout of the print medium is displayed in a vertical direction or horizontal direction, enabling the user to instantly determine whether the label data is vertical writing or horizontal writing. The size of the print medium is displayed at an exterior side of a tip edge portion in a conveying direction, and in parallel with the tip edge portion. The user can thus instantly find out the size of the print medium and can also find out at a first glance the conveying direction of the layout.

To achieve the purpose of the disclosure, there is provided a label data creating method comprising: a layout display step of displaying a layout of a long print medium onto which print data will be printed, on a display screen of a display, in a vertical direction or horizontal direction corresponding to a vertical writing or horizontal writing of label data to be printed on the print medium; and a size display step of displaying a size of the print medium at an exterior side of a tip edge portion of the layout displayed in said layout display step in a conveying direction thereof, and in parallel with the tip edge portion.

According to the label data creating method, the layout of the print medium is displayed in a vertical direction or horizontal direction, enabling the user to instantly determine whether the label data is vertical writing or horizontal writing. The size of the print medium is displayed at an exterior side of the tip edge portion in a conveying direction, and in parallel with the tip edge portion. The user can thus instantly find out the size of the print medium and can also find out at a first glance the conveying direction of the layout.

To achieve the purpose of the disclosure, there is provided a computer program product used and executed by a label data creating apparatus comprising: a computer readable recording medium; and a computer program stored in the computer readable recording medium, wherein the computer program includes: a layout display step of displaying a layout of a long print medium onto which print data will be printed, on a display screen of a display, in a vertical direction or horizontal direction corresponding to a vertical writing or horizontal writing of label data to be printed on the print medium; and a size display step of displaying a size of the print medium at an exterior side of a tip edge portion of the layout displayed in said layout display step in a conveying direction thereof, and in parallel with the tip edge portion.

According to the computer program product, the computer loads the program stored in the recording medium and displays the layout of the print medium in a vertical direction or horizontal direction so as to correspond to vertical writing or horizontal writing for label data to be printed on the print medium. The computer displays the size of the print medium at an exterior side of the tip edge portion in a conveying direction, and in parallel with the tip edge portion.

Displaying the layout of the print medium in a vertical direction or horizontal direction enables a user to instantly determine whether the label data is vertical writing or horizontal writing. The size of the print medium is displayed at an exterior side of the tip edge portion of the layout, and in parallel with the tip edge portion. The user can thus instantly find out the size of the print medium and can also find out at a first glance the conveying direction of the layout.

BRIEF DESCRIPTION OF THE DRAWINGS

FIG. 9 is a view showing one example of a sheet type table stored in the ROM of the tape printer;

FIG. 10 is a view showing one example of a die cut type table stored in the ROM of the tape printer;

DETAILED DESCRIPTION

A detailed description of one exemplary embodiment of a label data creating apparatus, a label data creating method, and a computer program product as applied to a label printing system according to the disclosure will now be given referring to the accompanying drawings.

Figure 1:
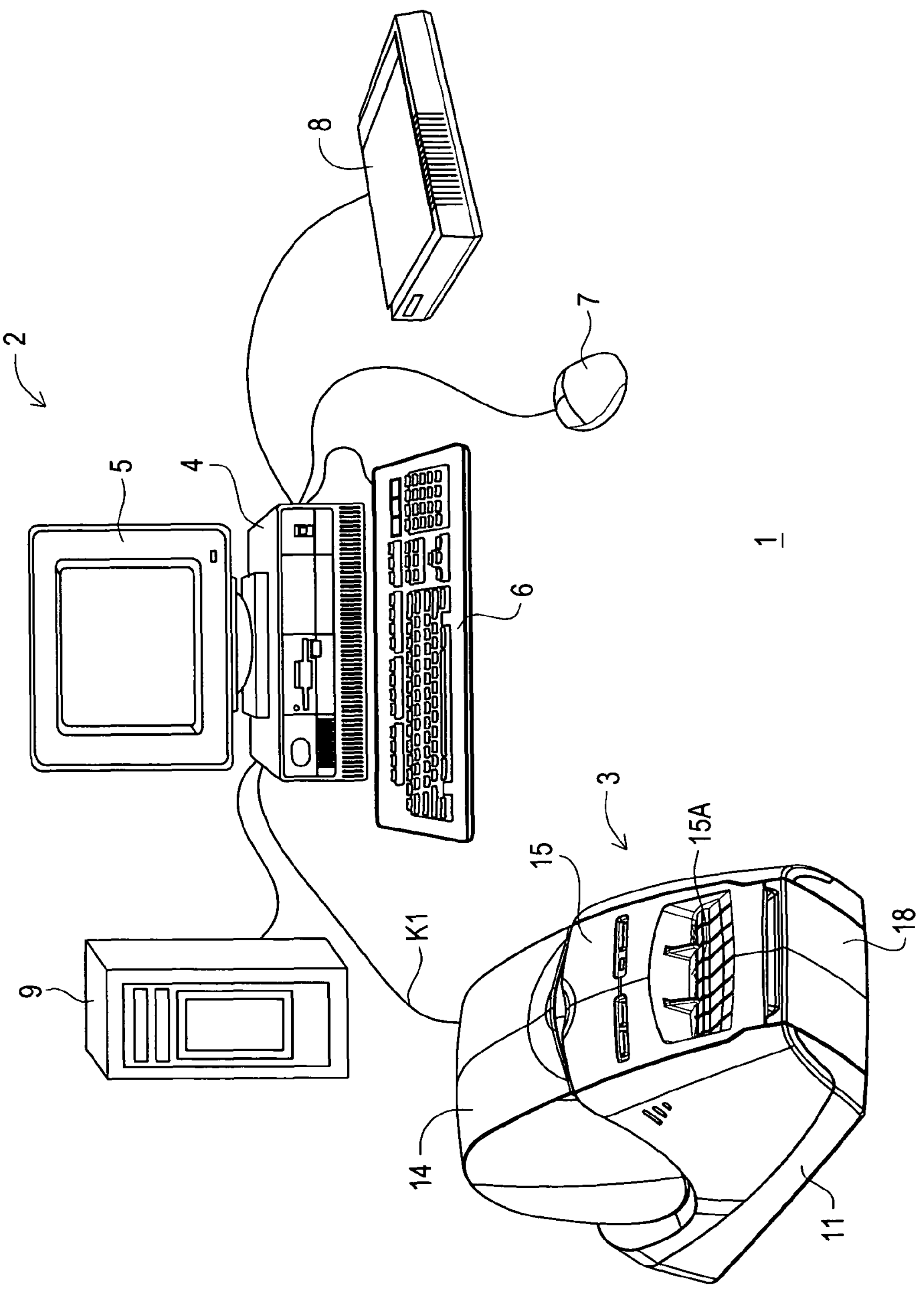
FIG. 1 shows a schematic configuration of a label printing system according to a preset embodiment.

First, a schematic configuration of a label printing system 1 according to the present embodiment will now be described based on FIG. 1. As shown in FIG. 1, the label printing system 1 according to this embodiment is composed of a computer device 2, given as one example of a label data creating apparatus and including a personal computer and the like; and a tape printer 3 connected to the computer device 2 through a signal cable K1.

The computer device 2 comprises a host controller 4, a display (such as CRT, LCD and the like) 5, a keyboard 6, a mouse 7, an image scanner 8, and a CD-R/W drive 9. It is noted that the mouse 7 may be replaced with a joy stick or a track ball. CD-RW drive 9 may also be substituted by a MO device or a DVD device.

Next, a general configuration of a tape printer 3 will be described based on FIG. 2 through FIG. 5.

Figure 2:
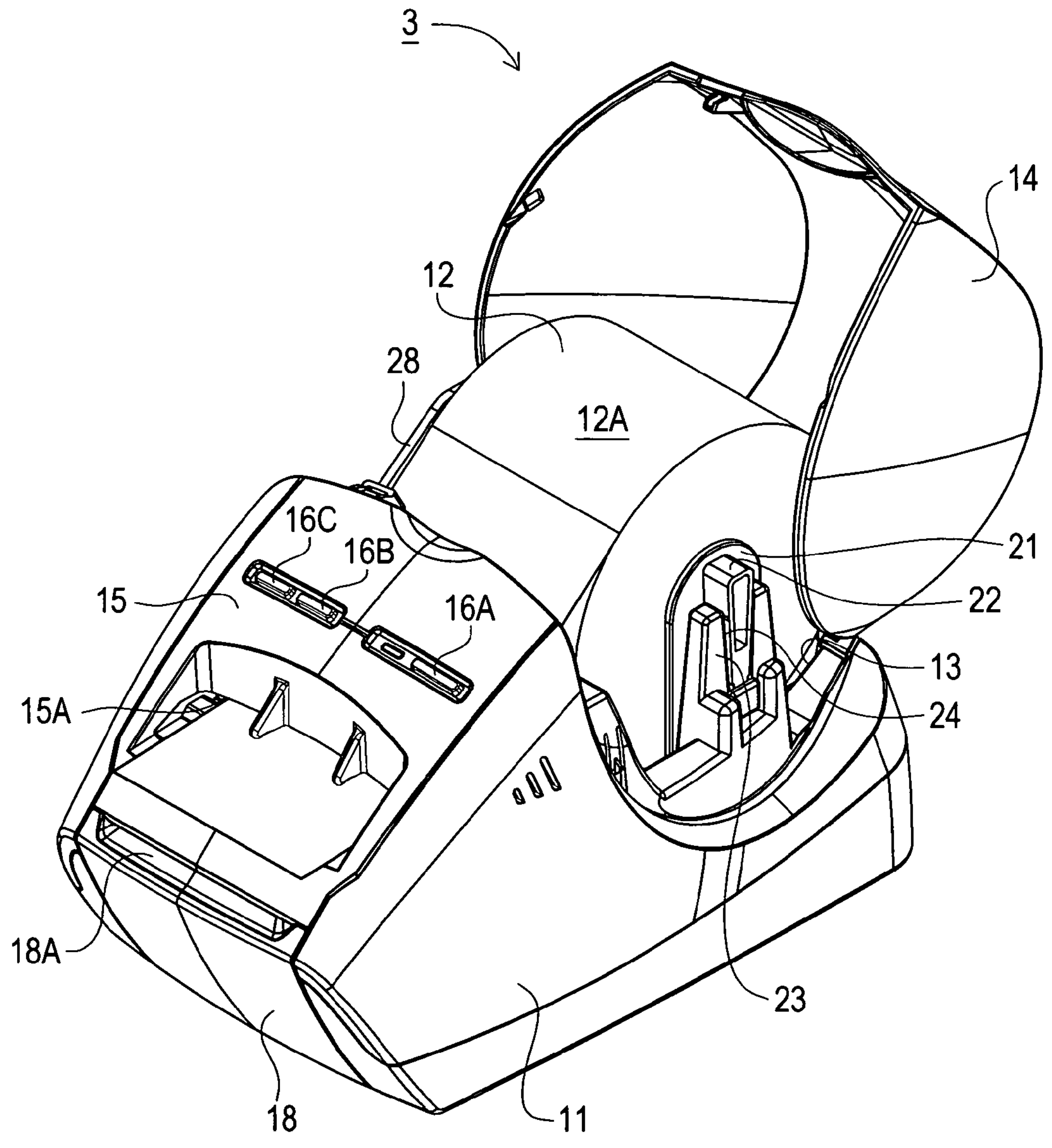
FIG. 2 is a perspective view taken from an upper right side of a tape printer as shown in FIG. 1, with a top cover thereof open, and a rolled sheet holder mounted therein.
Figure 5:
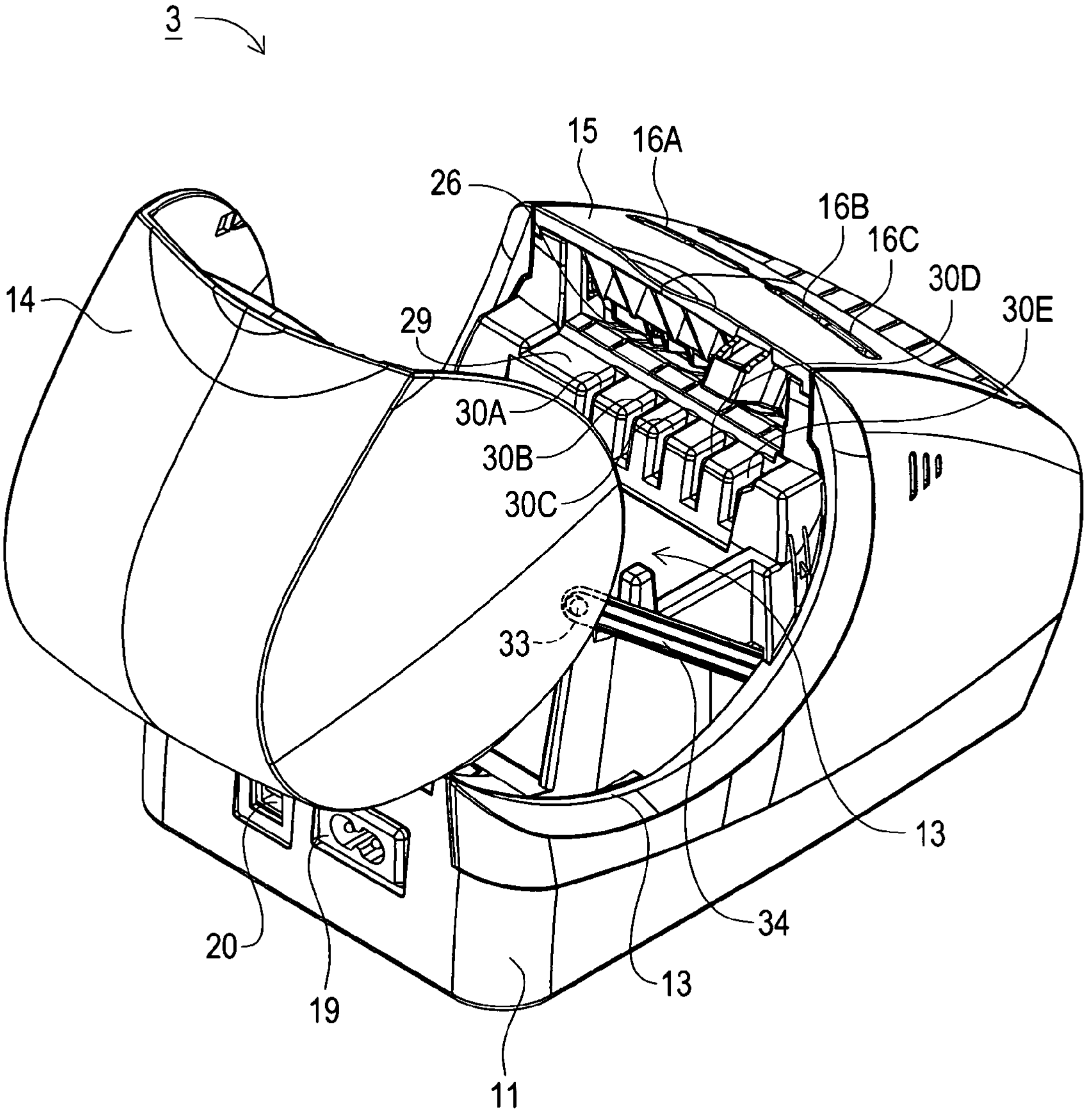
FIG. 5 is a perspective view taken from an upper left rear side of the tape printer, with the top cover thereof open.

As shown in FIG. 2 thorough FIG. 5, the tape printer 3 includes a resin body case 11, a rolled sheet holder 12, a rolled sheet holder housing section 13 and a top cover 14. The rolled sheet holder housing section 13 houses the rolled sheet holder 12 having rolled sheet 12A of a predetermined width wound thereon. The top cover 14 is made of a transparent resin and is formed in a substantially semicircular shape in side view, being fixed to a rear upper edge part of the tape printer 3, in a freely openable manner so as to cover the upper side of the rolled sheet holder housing section 13. The rolled sheet 12A is wound up on the rolled sheet holder 12 and includes a long thermal sheet (so called, thermal paper) having self color development characteristics, a non-fixed length rolled sheet 12A obtained by adhering a release sheet to one side of the thermal sheet through an adhesive agent, or a die cut and the like obtained by half-cutting the thermal sheet of this non-fixed length rolled sheet 12A in a predetermined shape with a fixed pitch.

A sheet discharging port 15A through which the printed rolled sheet 12A is discharged outside is formed on the front cover 15 at a front side of the top cover 14. A power button 16A, a cut button 16B and a feed button 16C are arranged substantially in a horizontal manner on a front surface at an upper side of the sheet discharging port 15A. Upon being depressed, the cut button 16B drives a cutter unit 17 (refer to FIG. 3) provided inside the sheet discharging port 15A to cut the rolled sheet 12A. Upon being depressed, the feed button 16C discharges the rolled sheet 12A by a fixed amount in the conveying direction.

Figure 3:
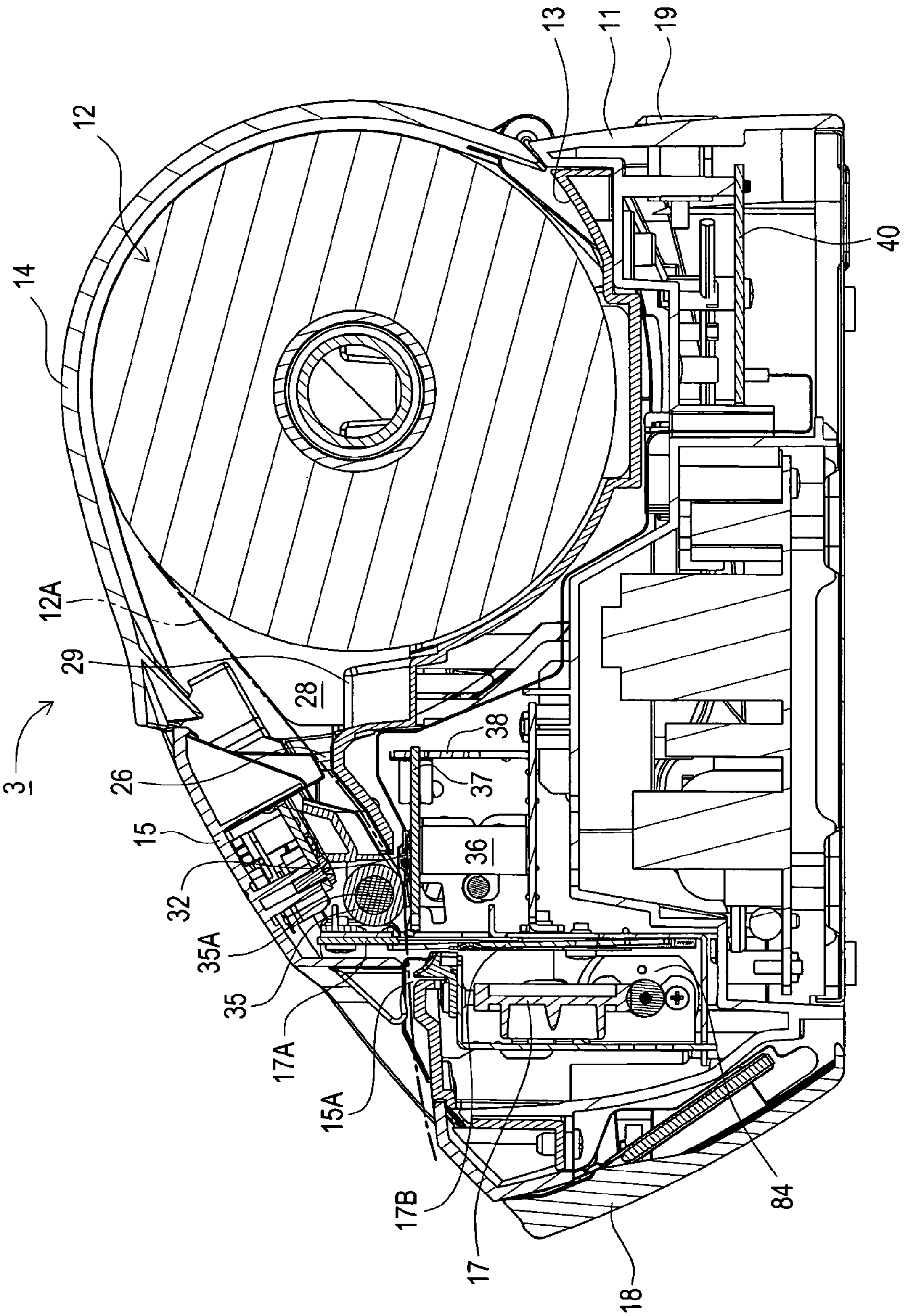
FIG. 3 is a sectional side view showing the state wherein the rolled sheet holder is mounted in the tape printer.

Here, as shown in FIG. 3, the cutter unit 17 is composed of a fixed blade 17A and a movable blade 17B. The movable blade 17B is operated to move in a vertical direction by a cutting motor 84 including a DC motor or the like. The printed rolled sheet 12A is conveyed so that a cutting position at a rear side in a conveying direction reaches a position facing the fixed blade 17A. At this point, the cutting motor 84 causes the movable blade 17B to move in a vertical direction, cutting the printed rolled sheet 12A. Also, the rolled sheet 12A that was cut by the fixed blade 17A and the movable blade 17B is discharged from the sheet discharging port 15A. The movable blade 17B is formed in a V-shape, in front view.

As shown in FIG. 2 and FIG. 3, a tray member 18 is fixed to a lower edge part of the front cover 15 in a freely openable manner so as to cover the front side of the front cover 15. The tray member 18 can be opened by placing a finger in a recess portion 18A formed at an upper end part and pushing towards the front side.

As shown in FIG. 5, an inlet 19 to which a power cord not shown is connected is provided at a rear part of the body case 11, and at the same time, a USB (Universal Serial Bus) connector 20 to which a signal cable K1 is connected is provided at a side part (in FIG. 5, the left side) thereof.

Figure 4:
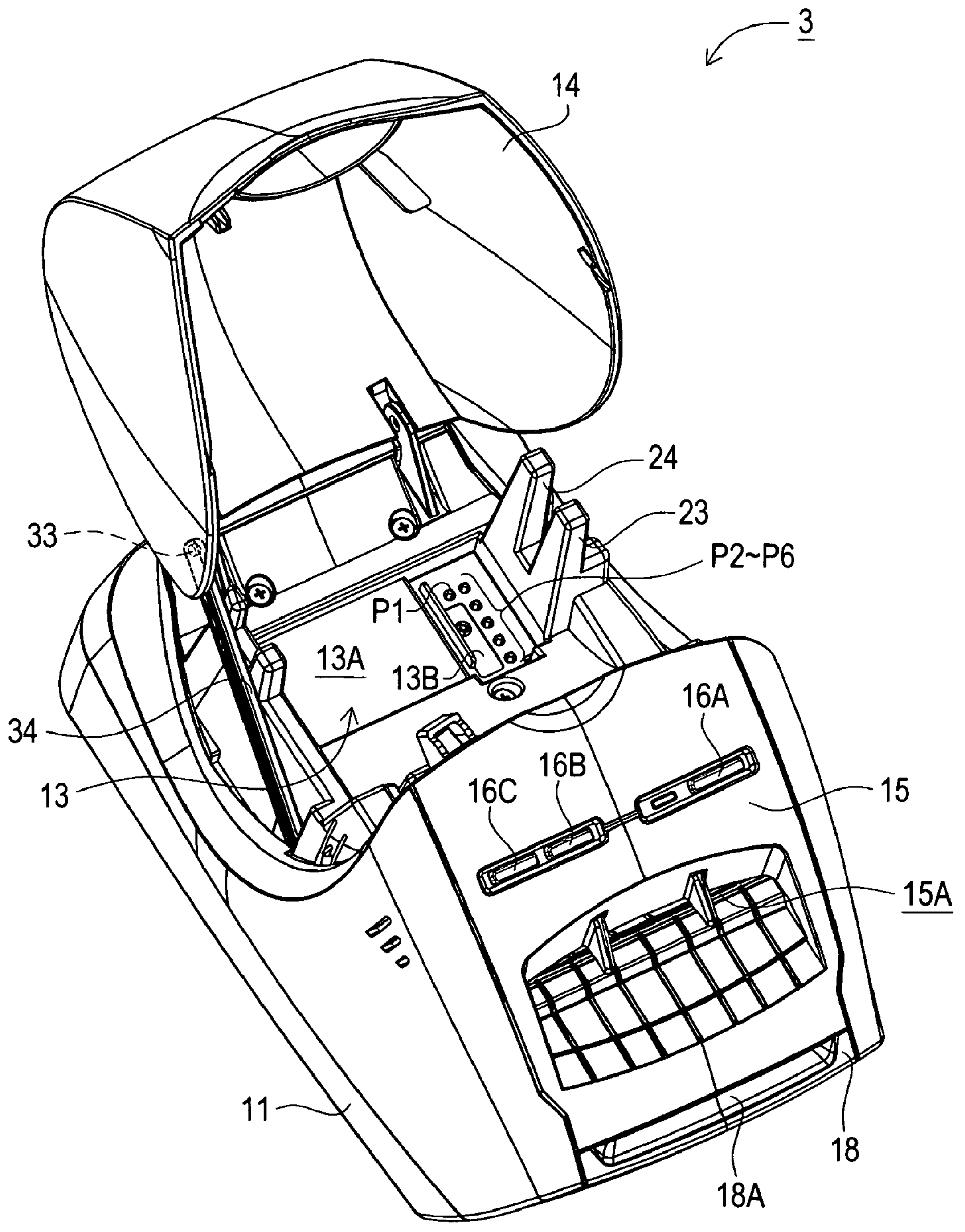
FIG. 4 is a perspective view taken from an upper left front side of the tape printer, with the top cover thereof open.

As shown in FIG. 2, FIG. 4 and FIG. 5, the tape printer 3 has a holder support member 23 provided at one side edge part (in FIG. 2, the right-side edge part) of the rolled sheet holder housing section 13, in a substantially perpendicular direction with respect to a conveying direction. The holder support member 23 can fit a fixing member 22 which has a substantially rectangular shape in cross section and is projected in an outer direction of a holding member 21 constituting a rolled sheet holder 12. This holder support member 23 has a first positioning groove part 24 formed therein, the groove being U-shaped in a substantially longitudinal direction in front view. The groove opens upward in a width direction and at the same time, at both sides in a width direction.

A loading portion 29 is also provided which extends in a substantially horizontal direction between a rear edge part of an insertion opening 26 (refer to FIG. 3) into which the rolled sheet 12A is inserted, and a front upper edge part of the rolled sheet holder housing section 13. Five second positioning groove parts 30A through 30E having a substantially L-shape in cross section are formed at a rear edge corner of the loading part 29 in a conveying direction, at each position corresponding to a plurality of width dimensions of the rolled sheet 12A. The respective second positioning groove parts 30A through 30E are formed so as to enable fitting, from upwards, of a tip lower end part of a guide member 28 that constitutes the rolled sheet holder 12, which tip lower end part comes in contact with the loading part 29, as shown in FIG. 3.

A positioning recess part 13A is formed in a bottom part of the rolled sheet holder housing section 13. The positioning recess part 13A is rectangular in plan view and long sideways in a substantially perpendicular direction with respect to a conveying direction, and extends between an inner base end part and an opposite side base end part of the holder supporting member 23. The positioning recess part 13A has a predetermined depth (in the present embodiment, approximately 1.5 through 3 mm). The positioning recess part 13A is formed so that the width dimension in a conveying direction is substantially equal to the width dimensions of the respective lower edge parts of the holding member 21 and guide member 28 constituting the rolled sheet holder 12.

A discrimination recess part 13B is formed at the inner base end part of the holder support member 23 of the positioning recess part 13A. The discrimination recess part 13B is rectangular in plan view and long in a longitudinal direction with respect to a conveying direction. The discrimination recess part 13B is formed so that a portion facing the sheet discrimination part 60 (refer to FIG. 6) extending inward from a lower edge part of the holding member 21 at a substantially right angle therewith is formed to be deeper than the positioning recess part 13A by a predetermined depth (in the present embodiment, approximately 1.5 through 3 mm deep).

The discrimination recess part 13B is provided with six discrimination sensors P1, P2, P3, P4, P5 and P6 arranged in an L-shaped pattern, for distinguishing the type, material, width and the like of the rolled sheet 12A. These sensors are each constructed of a push-type micro-switch, etc.

These sheet discrimination sensors P1 to P6 are each constructed of a well known mechanical switch including a plunger and a micro-switch, etc. Each plunger is placed so that an upper end part thereof protrudes from the bottom part of the discrimination recess part 13B to the vicinity of the bottom part of the positioning recess part 13A. It is detected whether the sheet discrimination part 60, which extends inward from the lower edge part of the holding member 21 at a substantially right angle therewith, has sensor holes 60A to 60F (see FIG. 6), mentioned later, at the positions corresponding to the sheet discrimination sensors P1 to P6 respectively. Based on an ON/OFF signal representing a detection result by the sensors P1 to P6, the type, material, width and the like of the rolled sheet 12A loaded in the rolled sheet holder 12 are detected.

In the present embodiment, the plungers of the sheet discrimination sensors P1 to P6 normally protrude from the bottom surface of the discrimination recess part 13B to the vicinity of the bottom surface of the positioning recess part 13A. At this time, each micro-switch is in an OFF state. In the case where the sheet discrimination part 60 has sensor holes 60A through 60F at the positions corresponding to the sheet discrimination sensors P1 to P6, the plungers of the sensors are not depressed, leaving the corresponding micro-switches in the OFF state, which generates an OFF signal.

On the other hand, in the case where the sheet discrimination part 60 does not have sensor holes 60A through 60F at the positions corresponding to the sheet discrimination sensors P1 to P6, the plungers of the sensors are depressed, bringing the corresponding micro-switches into an ON state, which generates an ON signal. Accordingly, the respective sheet discrimination sensors P1 through P6 output 6-bit signals made up of [0] and [1]. Thus, if the sheet discrimination sensors P1 through P6 are all in an OFF state, specifically, if the rolled sheet holder 12 is not loaded, a 6-bit signal [000000] is output.

An engaging shaft 33 is erected in an inner side of the top cover 14, at the periphery of the opening for the cover, facing the side edge part opposite the holder support member 23 of the holder housing part 4. The engaging shaft 33 has a circular shape in cross section and its height is substantially equal to the thickness of the link lever 34. This engaging shaft 33 is fitted in a through hole formed in one edge part of the link lever 34 for operating the vertical movement of the thermal head 32 (refer to FIG. 3) so as to allow the edge part of this link lever 34 to freely rotate and detach with respect to the engaging shaft 33.

As shown in FIG. 3, a roller shaft 35A of the platen roller 35 is supported, in a freely rotatable manner, at a back side of the insertion opening 26 in a conveying direction of the rolled sheet. The thermal head 32 is fixed on an upper surface of a head support member 37 which is biased upward by a pressure sensitive spring 36. The rear edge part of the head support member 37, with respect to a conveying direction, is supported on a rear side of a frame 38 so as to allow swinging thereof in a vertical direction.

When the top cover 14 is turned backward for opening, the link lever 34 moves backward in cooperation with the movement of the top cover 14, causing the thermal head support member 37 to move downward, and separating the thermal head 32 from the platen roller 35 arranged opposite therefrom. The rolled sheet 12A is then fed from the insertion opening 26, allowing insertion of the rolled sheet 12A between the platen roller 35 and the thermal head 32.

When closing the top cover 14, the link lever 34 is moved forward in cooperation with the movement of the top cover 14, causing the thermal head support member 37 to move upward. The thermal head 32 then forces the rolled sheet 12 against the platen roller 35 by means of the pressure sensitive spring 36, whereby a printable state is obtained.

Further, below the rolled sheet holder housing section 13, there is provided, through a dividing wall 39, a control board 40 on which a control circuit is formed to drivingly control mechanisms such as the thermal head 32, etc. in response to commands from a computer device 2 or the like.

A schematic configuration of the rolled sheet holder 12 will next be described based on FIG. 6.

Figure 6:
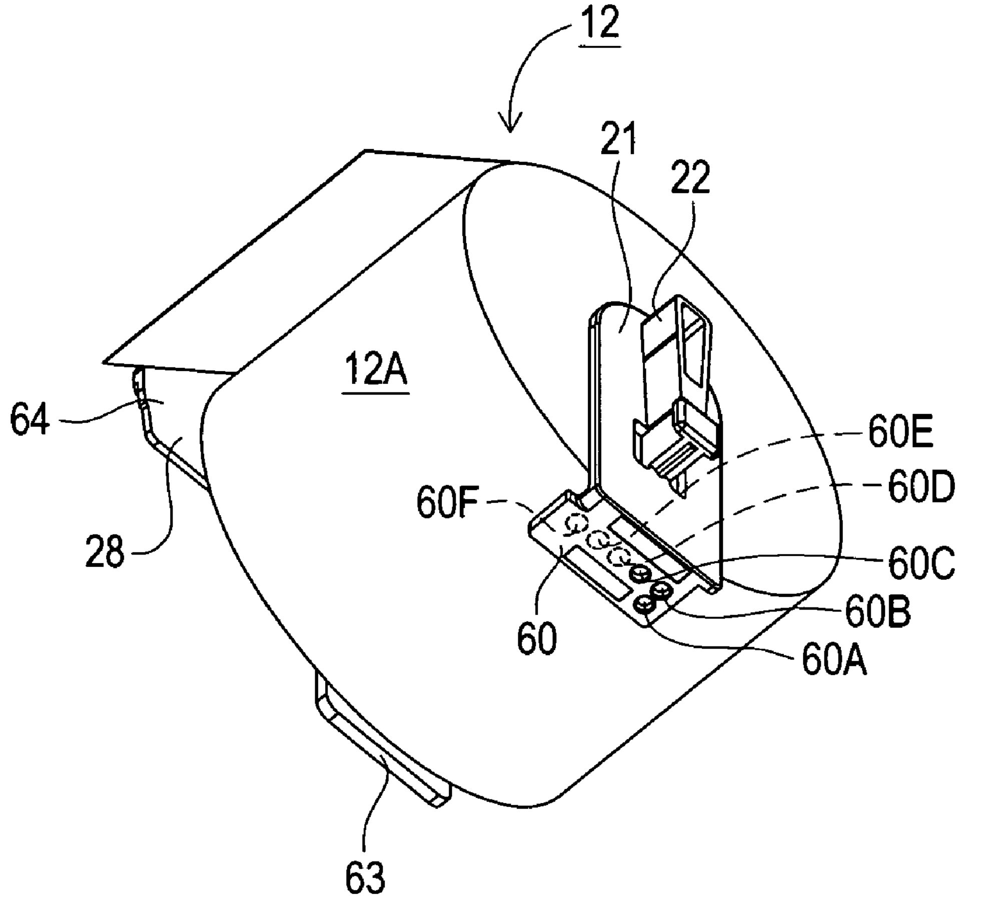
FIG. 6 is a perspective view taken from a lower side and shows one example of a rolled sheet holder having a rolled sheet loaded therein.

As shown in FIG. 6, the rolled sheet holder 12 which has the rolled sheet 12A wound on a sheet core loaded therein in a rotatable manner, has the following configuration.

The guide member 28 constituting the rolled sheet holder 12 is formed with a first extended portion 63 which extends downward and is fitted in the positioning recess part 13A formed in the bottom part of the rolled sheet holder housing section 13 so as to be brought in contact with the bottom surface of the positioning recess part 13A. The guide member 28 is also formed with a second extended portion 64 which has an upper edge part thereof sloped downward to the front side of the loading part 29, so as to cover a substantially front quarter round of the outer end face of the rolled sheet 12A.

The second extended portion 64 has a lower end part which extends substantially horizontally, and a tip lower end part which is inserted in any of the second positioning groove parts 30A to 30E facing the sheet width of the rolled sheet 3A thus loaded. The second extended portion 64 is formed so that one side edge of the rolled sheet 12A thus loaded is guided along the inner surface of the second extended portion 64 up to the insertion opening 26 (refer to FIG. 2).

A holder shaft member 62 erected on an inner surface of the guide member 28 and an inner surface of the holding member 21 serves to rotatably support the sheet core onto which the rolled sheet 12A is wound. The holder shaft member 62 may be selected from amongst a plurality of types of shafts (five shafts including 12 mm, 17 mm, 29 mm, 38 mm and 62 mm in the present embodiment) of different lengths individually corresponding to the lengths of the sheet core for the rolled sheet 12A.

A mounting member 22 of the holding member 21 is formed so as to become narrower in a downward direction in a front view (bottom in FIG. 6) and to be fitted in the first positioning groove part 24 having a narrower width towards the bottom of the holder support member 23 in the tape printer 3. The mounting member 22 is formed so that the protruding height thereof becomes almost equal to the width of the first positioning groove part 24. Accordingly, to mount the rolled sheet holder 12, the mounting member 22 is inserted into the first positioning groove part 24. Thus, the rolled sheet holder 12 can be fitted in place.

The holding member 21 is designed to have its lower edge part of the guide member 28 extending downward longer by a predetermined length (about 1.0 mm to 2.5 mm in this embodiment) than the lower edge part of the guide member 28. The holding member 21 is also provided, at the lower edge part thereof, with a sheet discrimination part 60 of a substantially rectangular shape extending inward by a predetermined length at substantially right angle therewith. As mentioned earlier, the sheet discrimination part 60 is formed with the sensor holes 60A to 60F arranged at predetermined positions corresponding to the sheet discrimination sensors P1 through P6 respectively, in an L-shaped pattern. FIG. 6 shows that the sensor holes 60A through 60C from amongst sensor holes 60A through 60F have been formed in the sheet discrimination part 60.

Here, out of the 6 sensor holes 60A through 60F, maximum 5 sensor holes are formed in the sheet discrimination part 60. Specifically, the presence and absence of the respective sensor holes 60A through 60F are allocated “1” and “0” respectively so that the type, material and width of the rolled sheet 12A held in the rolled sheet holder 12 can be represented by 6-bit codes such as [000001] through [111111]. A 6-bit code such as [000000] shows that the rolled sheet holder 12 is not loaded.

Next, the circuit configuration of the computer device 2 constituting the label printing system 1 will now be described based on FIG. 7.

Figure 7:
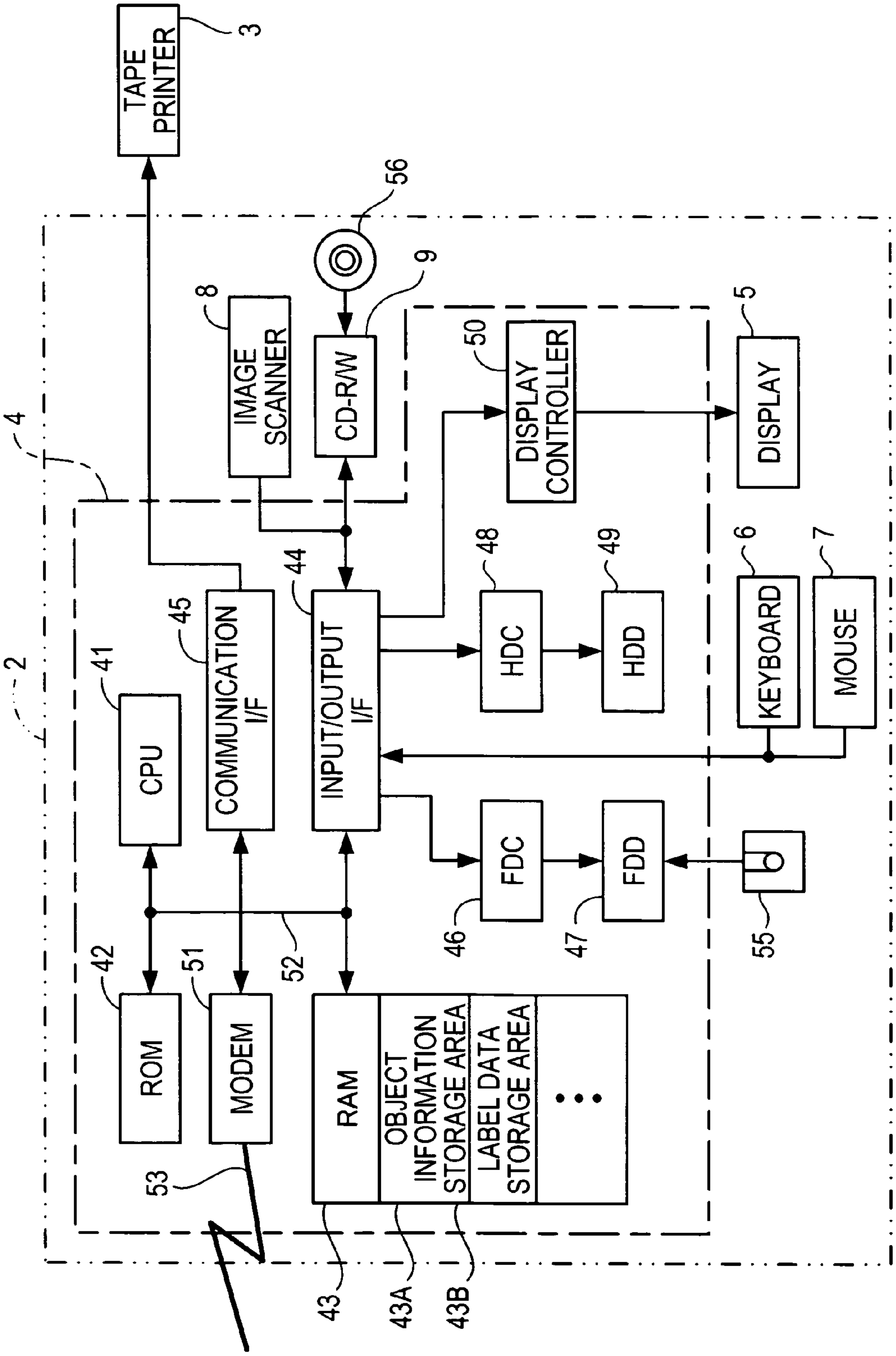
FIG. 7 is a circuit block diagram that shows a circuit configuration of a main section in the computer device as shown in FIG. 1.

As shown in FIG. 7, the host controller 4 of the computer device 2 has a CPU 41, a ROM 42, a RAM 43, an input/output interface (I/F) 44, a communication interface (I/F) 45, a Floppy™ disc controller (FDC) 46, a Floppy™ disc drive (FDD) 47, a hard disc controller (HDC) 48, a hard disc drive (HDD) 49, a display controller 50, a modem 51, and the like. The CPU 41, the ROM 42, the RAM 43, the input/output interface (I/F) 44, the communication interface (I/F) 45, and the modem 51 are interconnected through a bus line 52, whereby exchange of data is performed. To the input/output I/F 44, the FDD 47 and the HDD 49 are connected through the FDC 46 that drivingly controls the FDD 47, and the HDC 48 that drivingly controls the HDD 49, respectively. The display controller 50 is also connected to the input/output I/F 44. A telephone line 53 is connected to a modem 51.

The keyboard 6, the mouse 7, the image scanner 8 and the CD-R/W drive 9 are connected to the host controller 4. The keyboard 6 is used for entering characters and symbols through the input/output I/F 44. The mouse 7 is used for entering the coordinates on the display screen of the display 5. The image scanner 8 is used for capturing visible outline data and the like from drawings. The CD-R/W drive 9 is used for writing into and reading from a CD-ROM 56, print data and various kinds of application software such as layout editing software and the like for displaying a layout editing window 89 (refer to FIG. 12), as will be described later. Also, the display 5 is connected to the host controller 4 through the display controller 50. The display 5 displays the layout editing window 89 as will be described later, and the layout and the like of a non-fixed length rolled sheet 12A. Further, the tape printer 3 is connected to the host controller 4, through the communication I/F 45 and the signal cable K1.

The CPU 41 controls the entire label printing system 1, and manages all data concerning the operation of the label printing system 1. The ROM 42 stores a startup program for booting the computer device 2 at power-on to start up the CPU 41, which is in common with general personal computers.

The RAM 43 temporarily stores different types of data when the CPU 41 performs various kinds of control. The RAM 43 has an object information storage area 43A and a label data storage area 43B. The object information storage area 43A stores object information such as image data or the like. The label data storage area 43B stores template data transmitted to the tape printer 3 and label data including character string data, drawing pattern data and the like entered through the keyboard 6.

The communication I/F 45 is composed of, for instance, a Centronics interface and USB (Universal Serial Bus), which allows interactive data communications with the tape printer 3 and an external electronic device (such as a computer or a laser printer).

The hard disc mounted on the HDD 49 stores an operating system (OS) of various kinds such as MS-DOS™ and Windows™. In addition, the hard disc also stores communication protocols for data communications with the tape printer 3 and the external electronic device, application software of various kinds, such as word processing software executable in the browser and the OS and a layout editing software for creating the label data for printing, as required.

A Floppy™ disc (FD) 55 which is easy to be inserted in or removed from the FDD 47 stores a variety of print data.

An optical disc (CD-ROM) 56 which is easy to be inserted in or removed from the CD-R/W drive 9 stores control programs of the control process such as the layout editing window for editing text and objects by inserting and displaying such in a print area to be described later, and object information included in objects of various formats, such as GIF, JPEG, BMP or the like (for instance, object name, length dimension of the original image for the object, width dimension of the original image for the object, image data and the like). This information is then supplied to the respective label creating apparatuses.

Next, the circuit configuration of the tape printer 3 constituting the label printing system 1 will be described based on FIG. 8 through FIG. 10.

Figure 8:
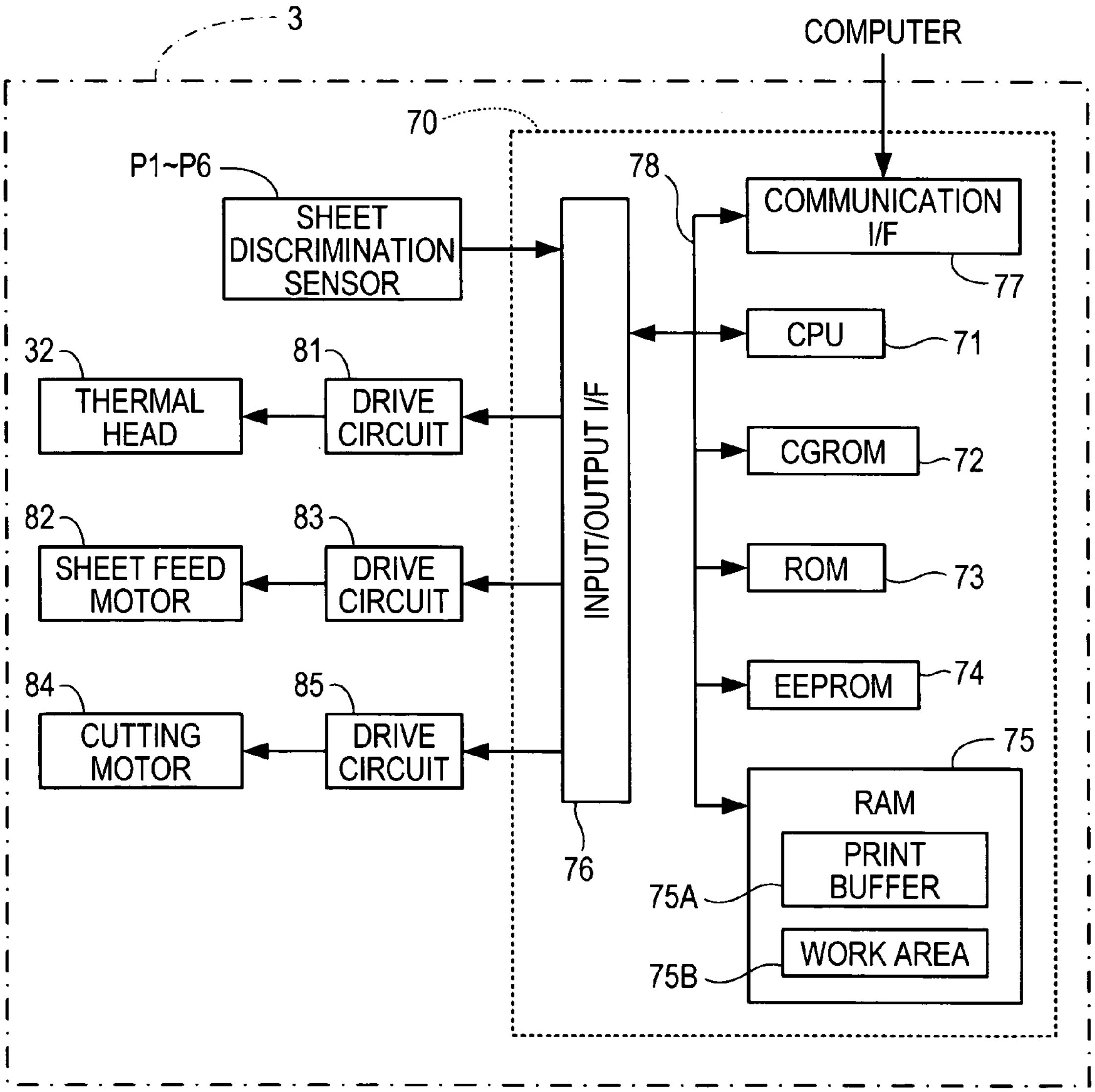
FIG. 8 is a circuit block diagram that shows a circuit configuration of a main section in the tape printer as shown in FIG. 1.

As shown in FIG. 8, a control circuit 70 formed on the control board 40 of the tape printer 3 has a CPU 71, a CG (character generator) ROM 72, a ROM 73, a flash memory (EEPROM) 74, a RAM 75, an input/output interface (“I/F”) 76, a communication interface (I/F) 77 and the like. The CPU 71, CGROM 72, ROM 73, flash memory 74, RAM 75, input/output interface ("I/F") 76 and the communication interface (I/F) 77 are interconnected through a bus line 78, whereby exchange of data is performed.

The CGROM 72 stores dot pattern data corresponding to individual characters. The dot pattern data is read out from the CGROM 72 and a dot pattern is printed on the thermal sheet of the rolled sheet 12A based on that dot pattern data.

The ROM 73 stores various types of programs, such as a label creating process program of the non-fixed length rolled sheet 12A, required to control the tape printer 3. The ROM 73 stores a sheet type table 731 (refer to FIG. 9) including the types of rolled sheet 12A with respect to the respective 6-bit codes inputted from the sheet discrimination sensors P1 through P6, and the material, etc. of the thermal sheet of the rolled sheet 12A corresponding to the respective 6-bit codes that were inputted from the sheet discrimination sensors P1 through P6. The ROM 73 stores a die cut type table 732 (refer to FIG. 10) including the dimensions of the die cut label for each die cut.

Here, one example of the sheet type table 731 which stores the various types of rolled sheet 12A corresponding to the individual 6-bit codes inputted from the sheet discrimination sensors P1 through P6 will now be described based on FIG. 9.

As shown in FIG. 9, the sheet type table 731 is composed of a [sheet discrimination sensor] column showing the 6-bit codes inputted from the respective sheet discrimination sensors P1 through P6, and a [rolled sheet type] column showing the type of the rolled sheet 12A corresponding to the respective 6-bit codes.

For instance, item [12 mm non-fixed length] in the [rolled sheet type] column corresponds to the case that the [sheet discrimination sensor] is [110100], and shows a rolled sheet 12A having 12 mm width and non-fixed length. Also, item [12 mm die cut 1] in the [rolled sheet type] column corresponds to the case that the [sheet discrimination sensor] is [111001] and shows a die cut wherein the thermal sheet of a 12 mm-wide non-fixed length rolled sheet 12A is half cut by a fixed pitch in a predetermined shape.

Here, one example of the die cut type table 732 wherein the dimensions of the die cut label for each individual cut are stored, will now be described based on FIG. 10.

As shown in FIG. 10, the die cut type table 732 is composed of a [die cut type] column that shows the type of the die cut and a [width×length] column showing the dimensions of the die cut labels that were half-cut. For instance, item [12 mm×54 mm] in the [width×length] column corresponds to the case that the [die cut type] is [12 mm die cut 1]. Specifically, the [12 mm die cut 1] shows that the thermal sheet of the 12 mm-wide non-fixed length rolled sheet 12A is half-cut in advance by a fixed pitch into die cut labels of [12 mm×54 mm].

The CPU 71 serves to execute various operations in accordance with the various programs stored in the ROM 73. The ROM 73 stores outline data related to individual large numbers of characters for defining outlines of the characters. The characters of the outline data are classified in units of a typeface (Gothic typeface, Mincho typeface, or the like), in correlation to code data. The dot pattern data is extracted to a print buffer 75A in accordance with the outline data.

The flash memory 74 serves to store dot pattern data such as extended character data received from an external computer device 2, etc. and dot pattern data such as various types of drawing pattern data, which have been allocated registration numbers. The flash memory 74 retains the stored contents even when the power of the tape printer 3 is OFF.

The RAM 75 temporarily stores results of various operations performed by the CPU 71. In the RAM 75 are provided various types of memories such as a print buffer 75A and a work area 75B or the like. The print buffer 75A stores print dot patterns such as a plurality of characters and symbols and number of applied pulses representing the energy amount for creating the dots, as dot pattern data. The thermal head 32 carries out dot printing in accordance with dot pattern data stored in the print buffer 75A.

The input/output I/F 76 is connected to the sheet discrimination sensors P1 through P6, a drive circuit 81, a drive circuit 83 and a drive circuit 85, etc., respectively. The drive circuit 81 is used for driving the thermal head 32. The drive circuit 83 is used for driving the sheet feed motor 82 which causes the platen roller to rotate. The drive circuit 85 is used for driving the cutting motor 84 that operates the vertical movement of the movable blade 17B.

The communication I/F 77 is connected to the USB connector 20, and to an external computer device 2 through a signal cable K1, allowing interactive data communications therewith. Accordingly, in case of a request for transmission of information with respect to the rolled sheet 12A loaded in the tape printer 3, from the CPU 41 of the computer device 2, the CPU 71 reads out information with respect to the rolled sheet 12A loaded in the tape printer 3 from the sheet type table 731 or the die cut type table 732, based on the output signal from the respective sheet discrimination sensors P1 through P6. The CPU 71 then transmits this information to the computer device 2. The CPU 71 creates the label sheet based on the print instruction command and print data that were transmitted from the CPU 41 of the computer device 2.

Next, a display control process carried out by the CPU 41 of the computer device 2 in the tape printing system 1 having the above configuration will be described based on FIG. 11 through FIG. 19. According to this process, the layout edit window 89 for editing the layout of label data to be printed on the rolled sheet 12A is displayed on the display screen of the display 5.

Figure 11:
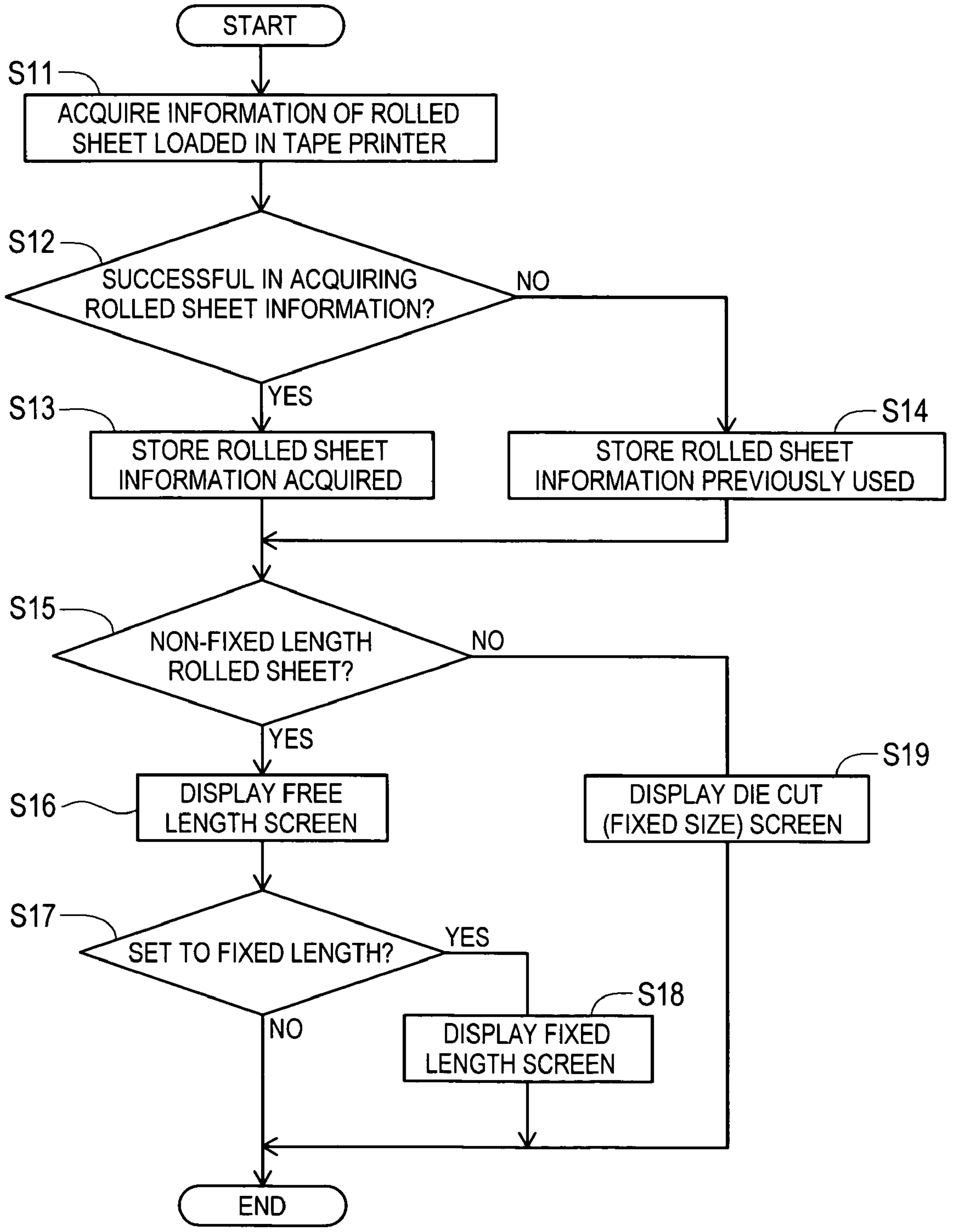
FIG. 11 is a flow chart showing a display control process of displaying a layout edit window on a display screen of the display, carried out by the CPU of the computer device shown in FIG. 1.

As shown in FIG. 11, at step (hereinafter referred to as S) 11, upon activation of a layout editing software for creating label data to be printed on the non-fixed length rolled sheet 12A, etc., the CPU 41 of the computer device 2 first acquires, from the CPU 71 of the tape printer 3, information with respect to the rolled sheet 12A such as the type (non-fixed rolled sheet, die cut, etc.), sheet width and the dimensions of the die cut label and the like of the rolled sheet 12A which is loaded in the tape printer 3, through the communication interface 45.

Next, at S12, the CPU 41 carries out a judgment process to judge whether or not information with respect to the rolled sheet 12A could be acquired from the tape printer 3. If information concerning the rolled sheet 12A can be acquired from the tape printer 3 (S12: YES), the CPU 41 shifts the flow to process S13. At S13, the CPU 41 stores the information concerning the rolled sheet 12A acquired from the tape printer 3 in the HDD 49, and then shifts the flow to process S15.

For instance, if the rolled sheet 12A is non-fixed length rolled sheet, a message indicating this and the sheet width and the like are stored in the HDD 49 as information with respect to the rolled sheet 12A. If the rolled sheet 12A is die cut, a message indicating this and the width and length dimensions and the like of the die cut label are stored in the HDD 49 as information with respect to the rolled sheet 12A.

Alternatively, if information with respect to the rolled sheet 12A cannot be acquired from the tape printer 3 (S12: NO), the CPU 41 shifts the flow to process S14. At S14, the CPU 41 reads out information with respect to the rolled sheet 12A last used in printing the text etc., from the HDD 49 and after storing again this information in the HDD 49 as information with respect to the rolled sheet 12A for text printing, the flow shifts to process S15.

Next, at S15, the CPU 41 executes a judgment process of reading out information concerning the rolled sheet 12A onto which text will be printed from the HDD 49 and judging whether the rolled sheet 12A is non-fixed length rolled sheet.

If the rolled sheet 12A is non-fixed length rolled sheet 12A (S15: YES), the CPU 41 shifts the flow to process S16. At S16, the CPU 41 displays the layout edit window 89 wherein the non-fixed length rolled sheet 12A is set to the free length print mode, on the display screen of the display 5. If the layout editing software has been activated, the print mode of the non-fixed length rolled sheet 12A is set to the free length print mode, setting the label data such as the text to be printed to horizontal writing.

Here, one example of the layout edit window 89 at its activation will now be described in the case that the free length print mode of the non-fixed length rolled sheet 12A is set, based on FIG. 12.

Figure 12:
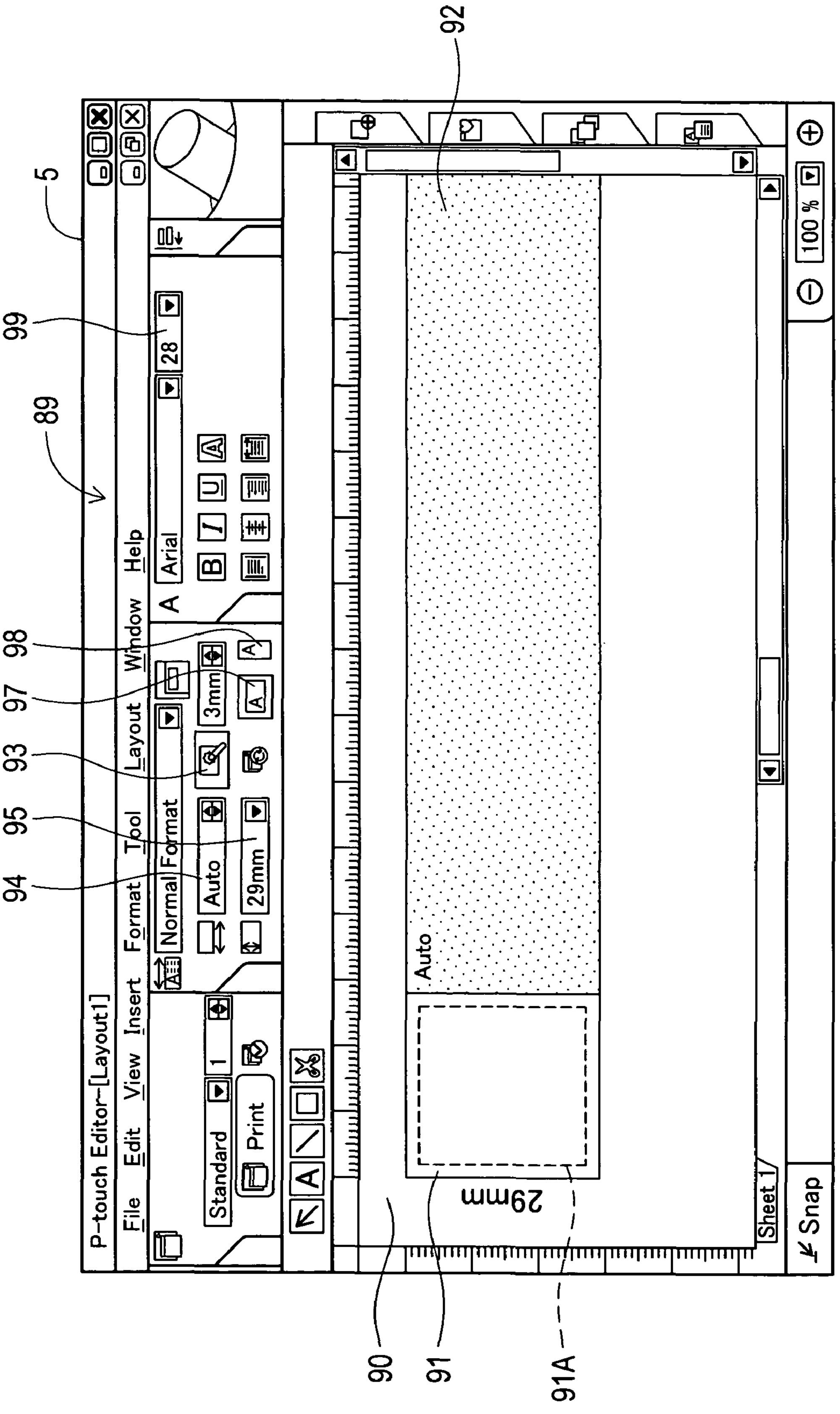
FIG. 12 is a view showing one example of the layout edit window at its activation, in the case that the non-fixed length rolled sheet is set to a free length print mode.

As shown in FIG. 12, the CPU 41 displays, on the display 5, a layout edit window 89 having a layout display window 90 formed therein. When a non-fixed length rolled sheet 12A being 29 mm wide is loaded in the tape printer 3, the CPU 41 displays a rectangular layout 91, indicating a non-fixed length rolled sheet 12A, which is 29 mm wide and has a predetermined length in a conveying direction (in the preset embodiment, approximately 28 mm), on the layout display window 90. Because the label data such as text to be printed is horizontal writing, the layout 91 is displayed so that the conveying direction thereof is along a left-to-right direction of the layout display window 90. The rectangular print area 91A is displayed by a broken line inside the layout 91. Specifically, the layout 91 is displayed to have a length at which maximum font size text which can be displayed in the print area 91A can be entered in the form of 2 to 3 characters in a conveying direction.

The CPU 41 indicates that the label data such as text to be printed is horizontal writing and the non-fixed length rolled sheet 12A is loaded. In this case, a semi-transparent rectangular outline 92 which is 29 mm wide and long sideways is displayed from the right side edge portion (rear side in a conveying direction) of the layout 91 up to the side edge portion of the layout display window 90. Also, characters [Auto] are displayed at a left upper corner of the outline 92 as a free length setting notation indicating that the free length print mode is set. At the same time, the brightness of the outline 92 is increased so as to show that the free length print mode is set, and the outline 92 is displayed in an illuminated fashion. The outline 92 can be displayed to have a length corresponding to the maximum free length which can be set in the free length print mode.

A free length/fixed length switch button 93 is arranged at an upper side of the layout display window 90. This button 93 is used to enter a command for switching between the free length print mode and the fixed length print mode. A fixed length input frame 94 is provided at a left side of the free length/fixed length switch button 93. The fixed length input frame 94 is used to set the fixed length of the non-fixed length rolled sheet 12A. At a lower side of the fixed length input frame 94 is displayed a sheet width input frame 95 which displays the width of the non-fixed length rolled sheet 12A loaded in the tape printer 3. A horizontal writing setting button 97 and a vertical writing setting button 98 are provided in parallel with each other. The horizontal writing setting button 97 is used for setting the label data such as text to horizontal writing. The vertical writing setting button 98 is used for setting the label data such as text to vertical writing. A font size display frame 99 is also provided for displaying the font size of the text.

If the free length print mode is set, text [Auto] is displayed in the fixed length input frame 94. If the fixed length print mode is set, the fixed length is displayed on the fixed length input frame 94. If a die cut is loaded in the tape printer 3, the sheet width dimension and the length dimension in the conveying direction of the die cut label is displayed on the sheet width input frame 95.

The CPU 41 displays the character string [29 mm] indicating the sheet width, at the exterior of the left side edge portion (tip edge portion in the conveying direction) of the layout 91 in a conveying direction, in parallel with the left side edge portion. When the user designates the coordinate position inside this print area 91A with the mouse 7 to identify and enter the respective characters or graphic symbols through the keyboard 6 as label data, the CPU 41 arranges and displays the characters and graphic symbols at the designated position at a predetermined size such as the maximum font size at which the text can be displayed in the print area 91A. The CPU 41 stores the respective label data in the RAM 43 as text data or image data corresponding to the print area 91A.

Here, one example of entering text in the print area 91A of FIG. 12 will be described based on FIG. 13 and FIG. 14.

Figure 13:
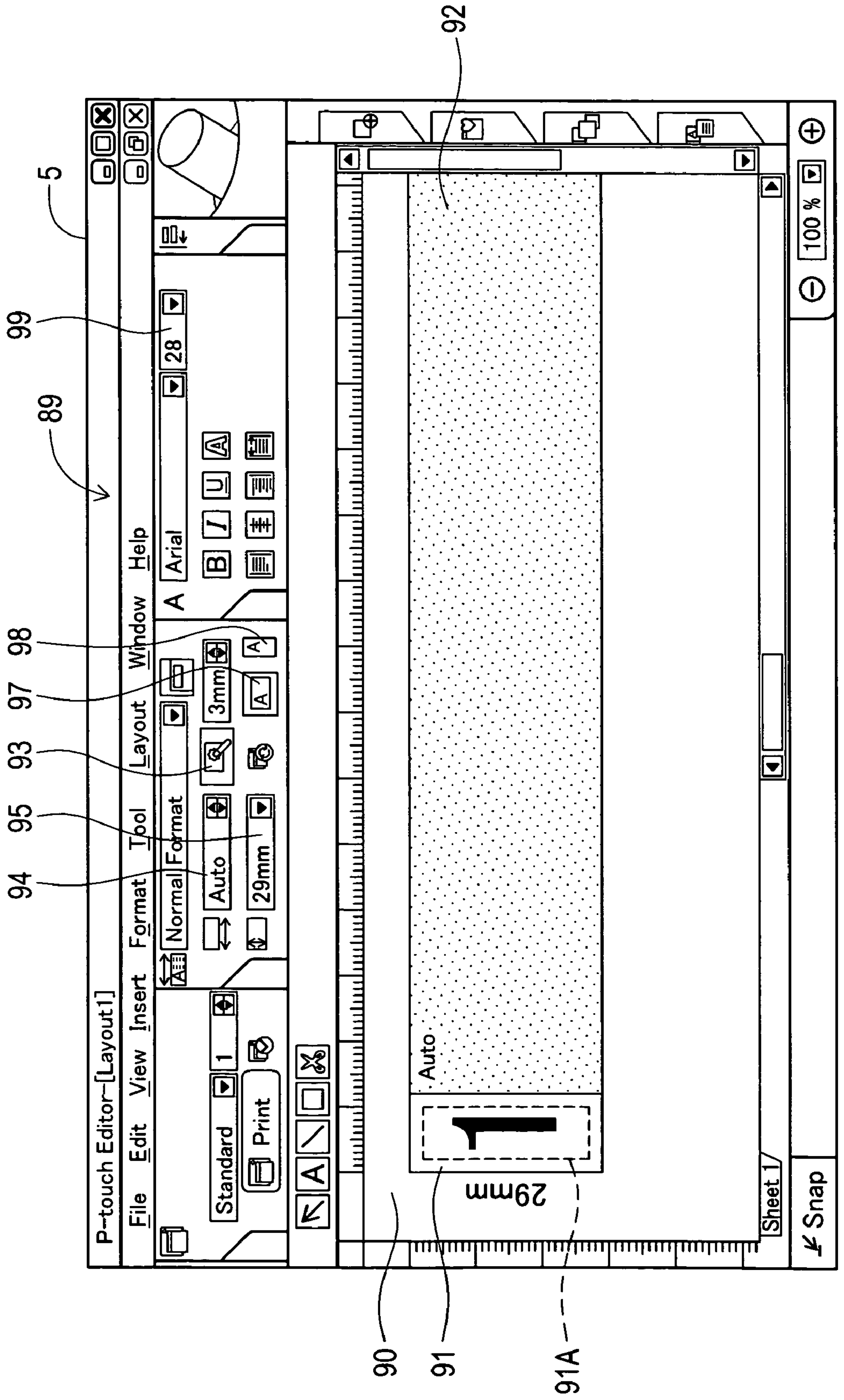
FIG. 13 is a view showing one example of the layout edit window in the case that text is entered in the form of one character in the print area shown in FIG. 12.

As shown in FIG. 13, when [1] is entered from the keyboard 6 and the free length print mode is set, the CPU 41 displays [1] at a maximum font size allowable for the print area 91A and shrinks this layout 91 in a crosswise direction to a length corresponding to one character. Simultaneously, the CPU 41 displays the outline 92 in an extended manner so that a left end thereof connects with the layout 91. Also, the text [Auto] indicating that the free length print mode is set is displayed at a left upper corner of the outline 92.

Figure 14:
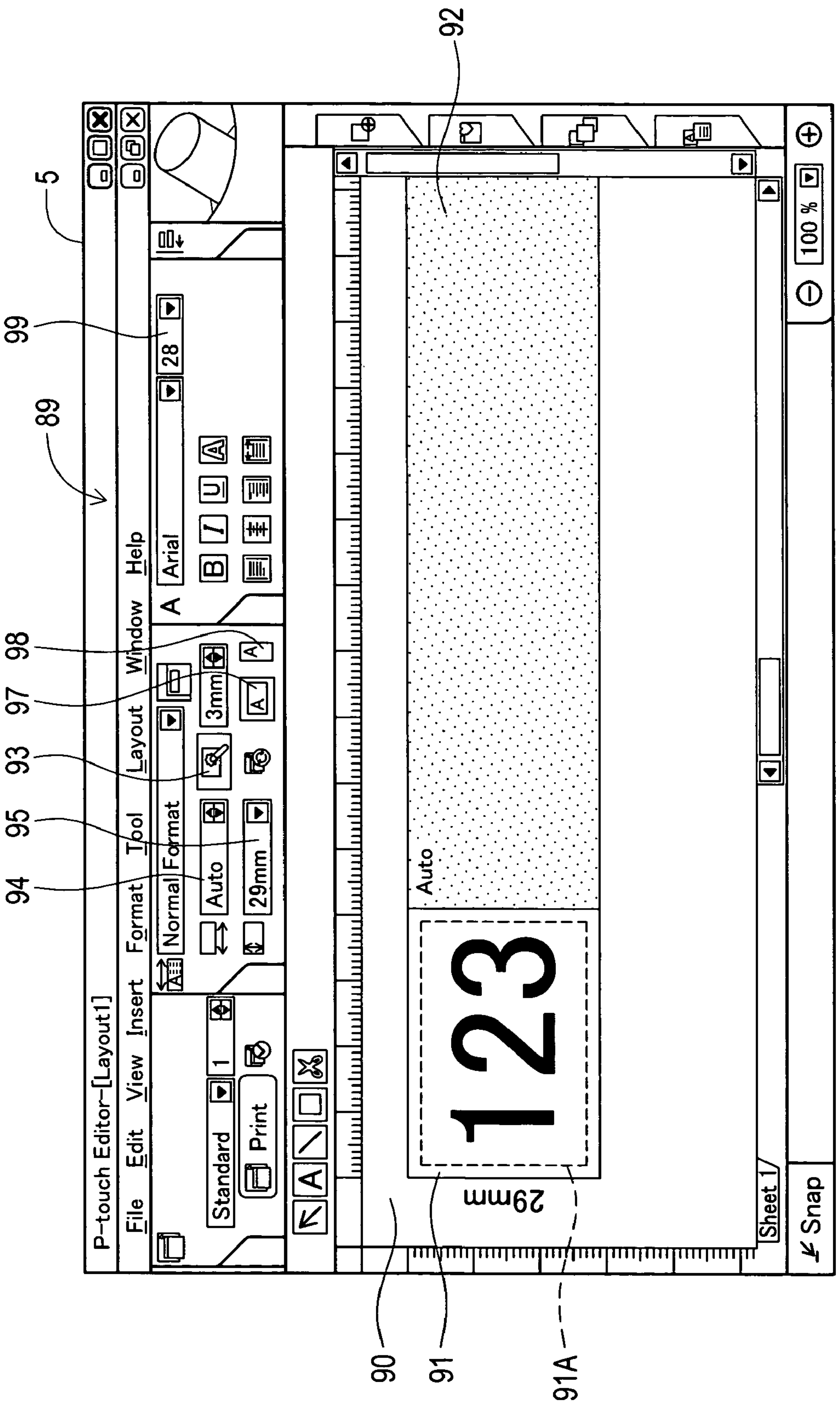
FIG. 14 is a view showing one example of the layout edit window in the case that text in the form of two characters is further entered in the print area of FIG. 13.

As shown in FIG. 14, if characters [2] and [3] are further entered from the keyboard 6 and the free length print mode is set, characters [23] are displayed following character [1] at a maximum font size which can be entered in the print area 91A. At the same time, this layout 91 is extended in a crosswise direction over the length of 3 characters. Simultaneously, the CPU 41 displays the outline 92 so that the left end thereof is connected to the layout 91. Text [Auto] indicating that the free length print mode is set is displayed at the left upper corner of the outline 92.

The text [Auto] may be displayed at the exterior of the outline 92, as long as it is in the neighborhood of the rear edge portion of the layout 91 in a conveying direction. In place of text [Auto], text such as [Free length], [Auto setting], or a symbol or mark such as a circle, a double circle or the like may be displayed at a left upper corner of the outline 92 to indicate that the free length print mode is set.

In the state as shown in FIG. 12, if the vertical writing setting button 98 is clicked with the mouse 7, the CPU 41 collectively rotates clockwise by 90 degrees the following items: the layout 91; the outline 92; the character string [29 mm] indicating the sheet width; and text [Auto] indicating that the free length print mode is set. Then, those items are displayed in a vertical direction with respect to the layout display window 90. The CPU 41 shrinks the outline 92 in a lengthwise direction so as to display the outline 92 from the lower side edge portion of the layout 91 to the lower side edge portion of the layout display window 90.

If the horizontal writing setting button 97 is depressed once again, the CPU 41 collectively rotates collectively counterclockwise by 90 degrees the following items: the layout 91;

the outline 92; the character string [29 mm] indicating the sheet width; and text [Auto] indicating that the free length print mode is set. Thereby, it results in obtaining the display state shown in FIG. 12.

If the layout 91 is displayed in a vertical direction, the vertical ruler is changed so that the layout 91 and outline 92 are displayed inside the layout display window 90.

Next, as shown in FIG. 11, at S17, the CPU 41 executes a judgment process of judge whether or not the free length/fixed length switch button 93 has been clicked with mouse 7, specifically, whether or not the fixed length print mode has been set. If the free length/fixed length switch button 93 is not clicked with the mouse 7 (S17: NO), the CPU 41 ends the process.

Alternatively, if the free length/fixed length switch button 93 is clicked with the mouse 7 (S17: YES), the CPU 41 shifts the flow to process S18. At S18, the CPU 41 changes the layout edit window 89 wherein the non-fixed length rolled sheet 12A is set to the free length print mode to the layout edit window 89 wherein the non-fixed length rolled sheet 12A is set to the fixed length print mode. Then, the CPU 41 ends the process.

Here, one example of the layout edit window 89 will be described based on FIG. 15 and FIG. 16. This layout edit window 89 corresponds to the case that the free length/fixed length switch button 93 of the layout edit window 89 as shown in FIG. 12 is clicked with the mouse 7 to set the non-fixed length rolled sheet 12A to the fixed length print mode.

Figure 15:
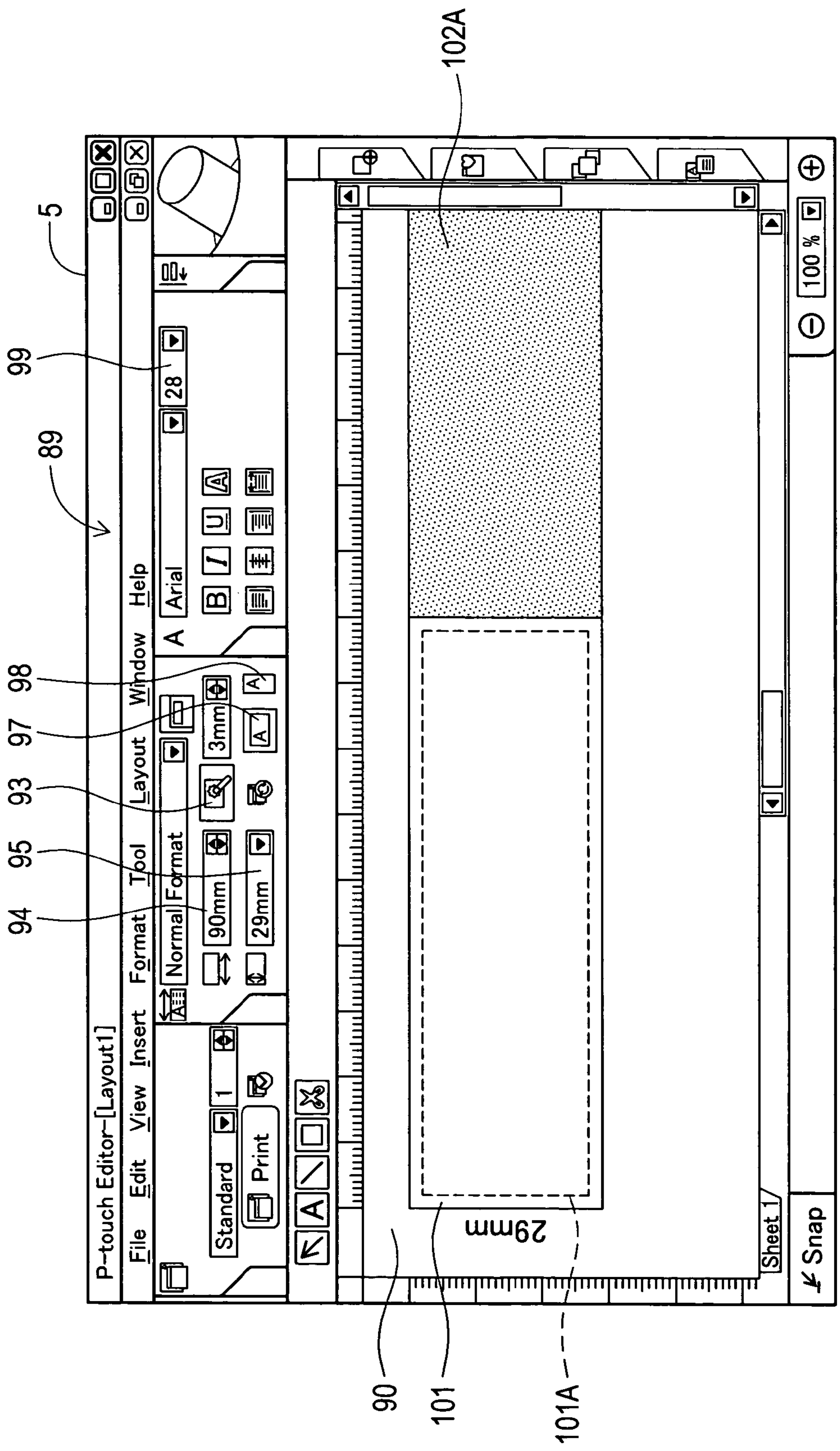
FIG. 15 is a view showing one example of the layout edit window in the case that the non-fixed length rolled sheet is set to a fixed length print mode.

As shown in FIG. 15, in place of the rectangular layout 91 which is 29 mm wide and has a predetermined length in a conveying direction (in the present embodiment, approximately 28 mm), the CPU 41 displays a rectangular layout 101 on the layout display window 90. This layout 101 is long sideways, and has a width of 29 mm and a fixed length of 90 mm, which is entered in the fixed length input frame 94. Inside the layout 101, a rectangular print area 101A which is long sideways is displayed by a broken line.

When the label data such as text to be printed is horizontal writing and the non-fixed length rolled sheet 12A is loaded, the CPU 41 displays the semi-transparent rectangular outline 102 which is 29 mm wide and long sideways from the right side edge portion of the layout 101 to the side edge portion of the layout display window 90. When the fixed length print mode is set, the text [Auto] indicating that the free length print mode is set is deleted. At the same time, the brightness of the outline 102 is decreased as compared to the brightness of the outline 92, being displayed in a darker fashion.

The CPU 41 displays the character string [29 mm] indicating the sheet width, at the exterior of the left side edge portion (tip edge portion in the conveying direction) of the layout 101, in parallel with the left side edge portion, to indicate the conveying direction.

Figure 16:
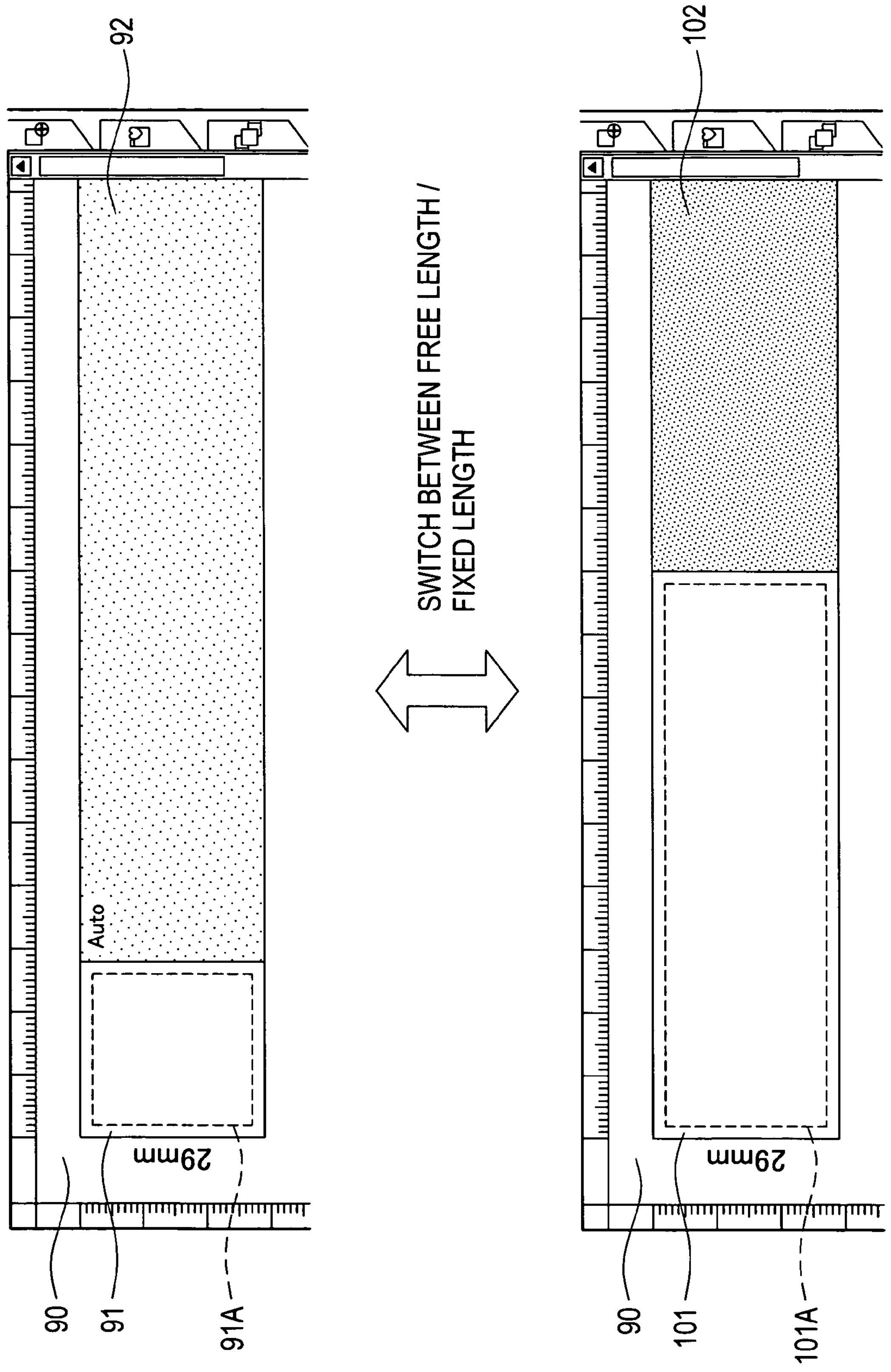
FIG. 16 is a view showing one example of switching display of the layout in the case that a free length/fixed length switch button as shown in FIG. 12 is clicked with a mouse.

As shown in FIG. 16, each time the free length/fixed length switch button 93 is clicked with the mouse 7, display is switched between the layout 91 corresponding to the case the free length print mode is set and the layout 101 corresponding to the case the fixed length print mode is set.

In the state shown in FIG. 15, if the vertical writing setting button 98 is clicked with the mouse 7, the CPU 41 collectively rotates the layout 101, the outline 102 and the character string [29 mm] indicating the sheet width clockwise by 90 degrees for display in a vertical direction of the layout display window 90. The CPU 41 shrinks the outline 102 in a vertical direction so as to allow display thereof from the lower side edge portion of the layout 101 to the lower side edge portion of the layout display window 90.

If the horizontal writing setting button 97 is depressed again, the CPU 41 collectively rotates the layout 101, the outline 102 and the character string [29 mm] showing the sheet width counterclockwise by 90 degrees, obtaining the display state as shown in FIG. 15.

If the layout 101 is displayed in the vertical direction, the vertical ruler is changed so that the layout 101 and the outline 102 are displayed inside the layout display window 90.

When the user designates the coordinate position inside the print area 101A with the mouse 7 to identify and enter the respective characters and graphic symbols and the like as label data through the keyboard 6, the CPU 41 arranges and displays the characters and graphic symbols at the designated position at a predetermined size, such as the maximum font size at which this data can be displayed in the print area 101A. The CPU 41 then stores the label data as text data or image data corresponding to the print area 101A in the RAM 43.

Here, one example of entering text in the print area 101A as shown in FIG. 15 will be described based on FIG. 17.

Figure 17:
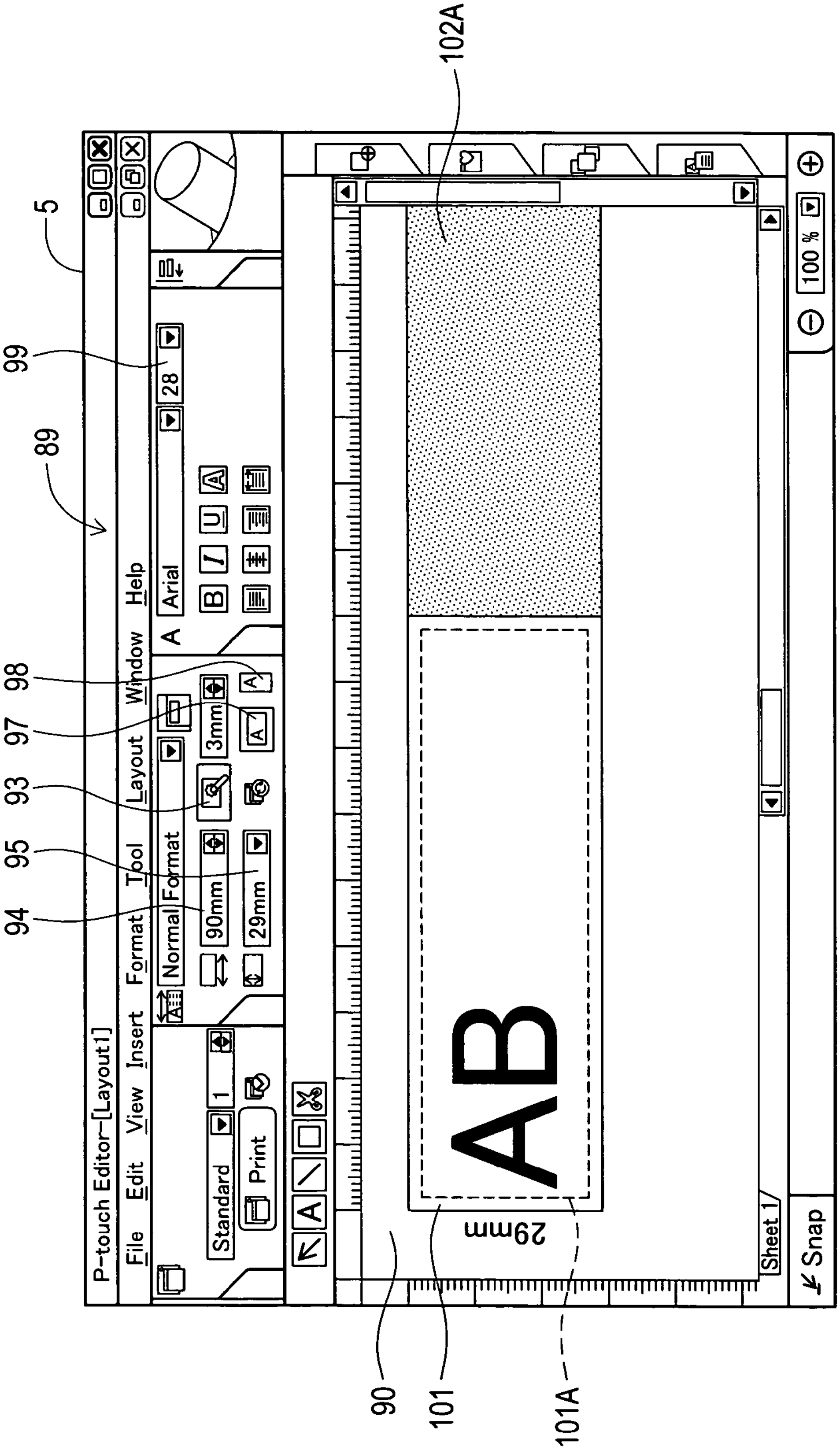
FIG. 17 is a view showing one example of the layout edit window in the case that text in the form of two characters is entered in the print area of FIG. 15.

As shown in FIG. 17, when characters [A] and [B] are entered from the keyboard 6, and the fixed length print mode is set, the CPU 41 displays characters [A] and [B] towards the left side of the print area 101 at the maximum font size allowable in the print area 101A, without changing the length of the layout 101. The CPU 41 also stores the label data in the RAM 43, as text data corresponding to the print area 101A.

The semi-transparent outline 92 which is rectangular in shape and long sideways and is displayed in case the free length print mode is set and the semi-transparent outline 102 which is rectangular in shape and long sideways and is displayed in the case that the fixed length print mode is set are divided by changing their brightness. However, the outlines 92 and 102 may also be divided by changing their color or by assigning different patterns thereto.

As shown in FIG. 11, at S15, if the rolled sheet 12A is other than the non-fixed length rolled sheet, specifically, if the rolled sheet 12A is a die cut obtained by half-cutting a thermal sheet of the non-fixed length rolled sheet into a predetermined shaped at a constant pitch (S15: NO), the CPU 41 shifts the flow to process S19. At S19, the CPU 41 displays the layout edit window 89 wherein layout 105 of a die cut label obtained by half-cutting the thermal sheet is displayed on the layout display window 90, on the display screen of the display 5 and then ends the process.

Here, one example of the layout edit window 89 at its activation will be described based on FIG. 18, in the case the rolled sheet 12A loaded in the tape printer 3 is die cut.

Figure 18:
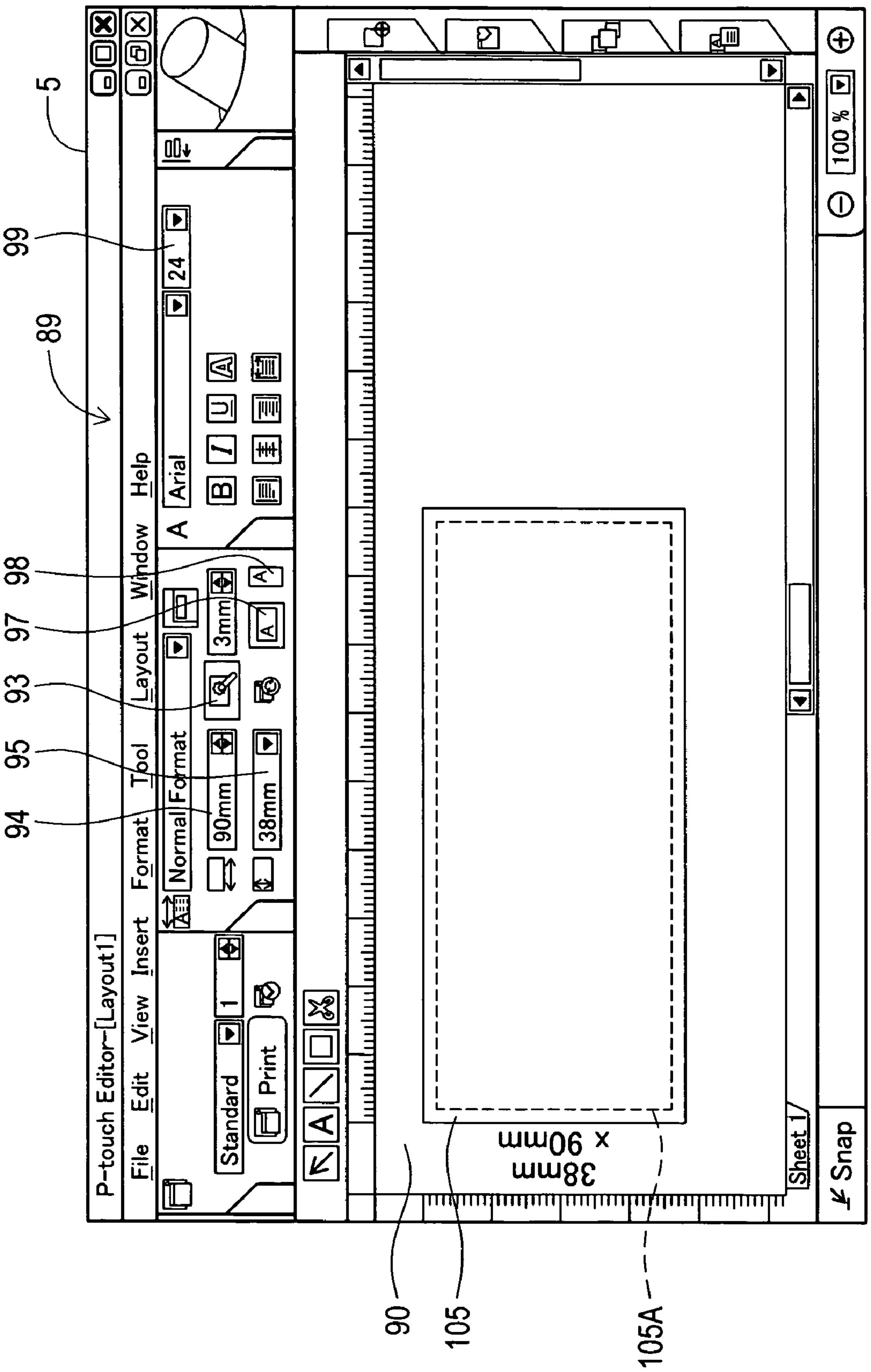
FIG. 18 is a view showing one example of the layout edit window at its activation, in the case of a die cut.

As shown in FIG. 18, the CPU 41 displays on the display 5, the layout edit window 89 having the layout display window 90 formed therein. If a die cut is loaded in the tape printer 3, the die cut including a die cut label being 38 mm wide and 90 mm long in a conveying direction and formed at a predetermined pitch, the CPU 41 displays a layout 105 on the layout display window 90, indicating a die cut label and being 38 mm wide and 90 mm long in a conveying direction. At an inner side of the layout 105 is displayed a rectangular print area 105A which is long sideways, by a broken line.

Here, when the label data such as text to be printed is horizontal writing, the CPU 41 displays the long side of the rectangular layout 105 which is long sideways along a left-to-right direction of the layout display window 90. The CPU 41 displays the character string [38 mm×90 mm], indicating the sheet width and the length of the die cut label in the conveying direction, in two rows at the exterior side of the left side edge portion (tip edge portion in the conveying direction) of the layout 105, in parallel with the left side edge portion, to show the conveying direction of the layout 105.

The CPU 41 displays, in the sheet width input frame 95, the character string [38 mm×90 mm] indicating the sheet width and the length of the die cut label in a conveying direction.

Because the rolled sheet 12A is die cut, the CPU 41 does not display an outline corresponding to the outline 92 or the outline 101 on the layout display window 90.

In the state shown in FIG. 18, if the vertical writing setting button 98 is clicked with the mouse 7, the CPU 41 collectively rotates the layout 105 and the character string [38 mm×90 mm] indicating the sheet width and the length of the die cut label in a conveying direction clockwise by 90 degrees for display in a vertical direction of the layout display window 90. Then, if the horizontal writing setting button 97 is clicked once again with the mouse 7, the CPU 41 collectively rotates the layout 105 and the character string [38 mm×90 mm] indicating the sheet width and the length of the die cut label in a conveying direction counterclockwise by 90 degrees to obtain the state as shown in FIG. 18. If the layout 105 is displayed in a vertical direction, the vertical ruler is changed so as to allow display of the layout 105 inside the layout display window 90.

When the user designates the coordinate position inside this print area 105A with the mouse 7 to identify and enter the size of the respective characters or graphic symbols through the keyboard 6 as label data, the CPU 41 arranges and displays the characters and graphic symbols at the designated position at a predetermined size. The CPU 41 stores the respective label data in the RAM 43 as text data or image data corresponding to the print area 105A.

Next, one example of entering text to the print area 105A as shown in FIG. 18 will be described based on FIG. 19.

Figure 19:
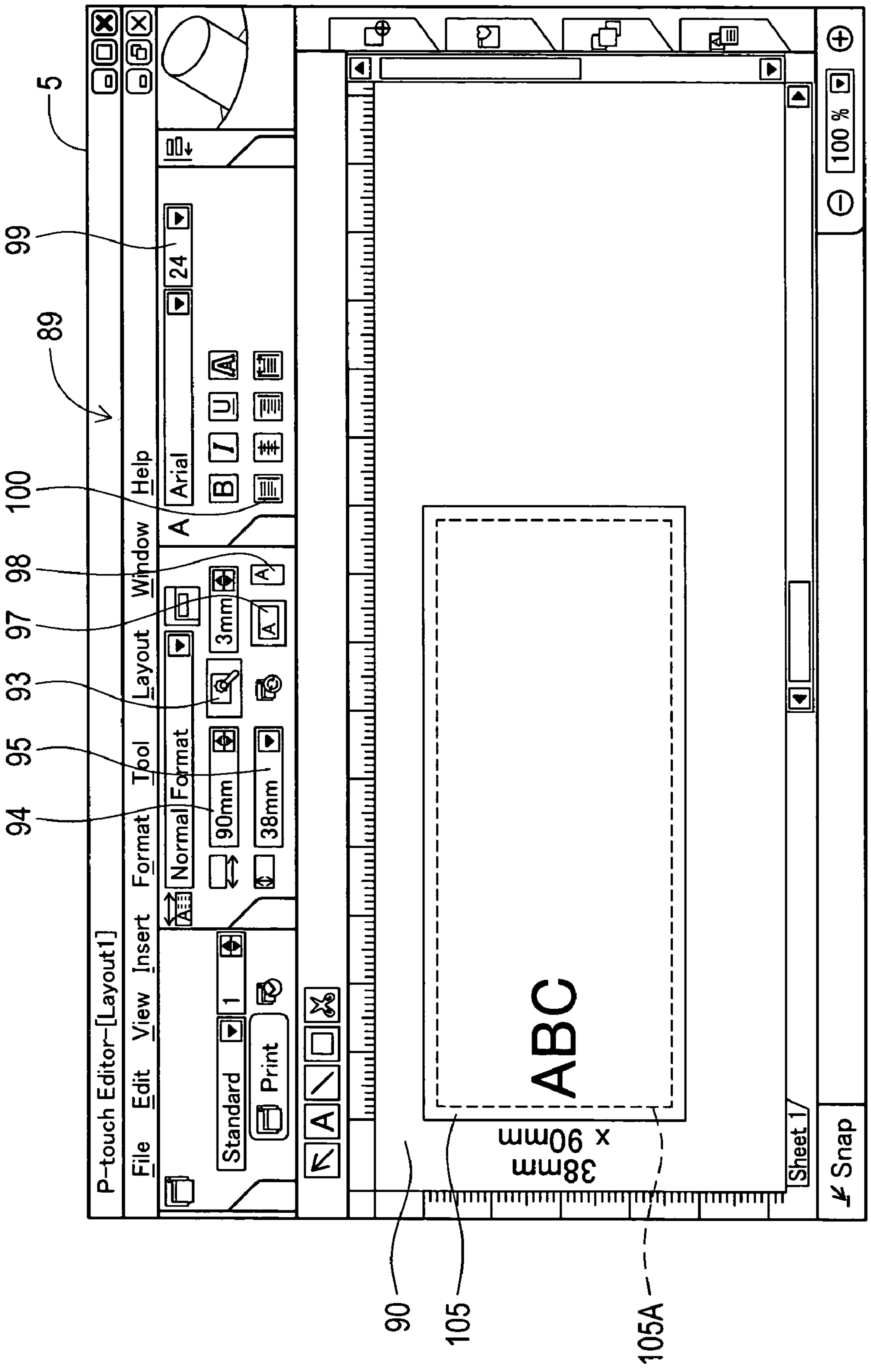
FIG. 19 is a view showing one example of the layout edit window in the case that text in the form of three characters is entered in the print area of FIG. 18.

As shown in FIG. 19, after the align left button 100 is clicked with the mouse 7 and characters [A], [B] and [C] are entered from the keyboard 6, the CPU 41 displays text [ABC] at the central part of the print area 105A in a vertical direction thereof, as horizontal writing aligned to the left side, at the font size displayed in the font size display frame 99. The CPU 41 then stores this label data in the RAM 43 as text data corresponding to the print area 105A.

As was described earlier in detail, in the label printing system 1 according to the present embodiment, if the non-fixed length rolled sheet 12A is loaded in the tape printer 3, the CPU 41 of the computer device 2 displays the width dimension of the non-fixed length rolled sheet 12A at the exterior of the left side edge portions (tip edge portion in a conveying direction) of the respective layouts 91 and 101 displayed on the layout display window 90 of the layout edit window 89, in parallel with the left side edge portion. As a result, the user can find out at a first glance the width of the non-fixed length rolled sheet 12A, and at the same time can also find out at a first glance the conveying direction of the respective layouts 91 and 101.

If the rolled sheet 12A loaded in the tape printer 3 is die cut, the CPU 41 displays the sheet width and the length of the die cut label in the conveying direction at the exterior of the left side edge portion (tip edge portion in a conveying direction) of the layout 105 for the die cut label displayed on the layout display window 90 of the layout edit window 89, in parallel with the left side edge portion. As a result, the user can find out at a first glance the sheet width and the length of the die cut label, and at the same time can also find out at a first glance the conveying direction of the layout 105.

If the non-fixed length rolled sheet 12A is loaded in the tape printer 3, the CPU 41 displays the respective semi-transparent rectangular outlines 92 and 102 which are longer sideways and have the same width as the layouts 91 and 101 so as to extend from the right side edge portions (rear side in a conveying direction) of the layouts 91 and 101 to the side edge portion of the layout display window 90. The CPU 41 displays the outlines 92 and 102 at different brightness. As a result, the user can instantly find out whether the rolled sheet 12A is the non-fixed length roll sheet can be set to the free length print mode or the fixed length print mode. The outlines 92 and 102 have different brightness, which enables a user to determine whether the free length print mode is set wherein the print area 91A of the layout 91 is extended toward the rear side in the conveying direction.

If the non-fixed length rolled sheet 12A is loaded in the tape printer 3 and the free length print mode is set, the CPU 41 displays the text [Auto] at the edge portion closer to the layout 91 of the outline 92. Alternatively, if the non-fixed length rolled sheet 12A is loaded in the tape printer 3 and the fixed length print mode is set, the CPU 41 does not display the text [Auto] at the edge portion closer to the layout 101 of the outline 102. Depending on the presence or absence of the text [Auto], the user can find out at a first glance, whether the free length print mode is set wherein the print area 91A of the layout 91 is extended at a rear side in the conveying direction.

If the fixed length print mode is set, the CPU 41 displays a layout 101 with a print area 101A of a fixed length formed therein, and displays an outline 102 corresponding to a free maximum length of the layout 101 at a rear side in a conveying direction. This enables a user to find out the fixed length of the print area 101A and easily find out whether the free length print mode can be set again.

If the non-fixed length rolled sheet 12A is loaded in the tape printer 3 and the free length print mode is set, the CPU 41 displays a layout 91 having a length enabling input of text, in the form of 2 to 3 characters, in a conveying direction, at a maximum font size which can be displayed in the print area 91A, when the layout edit window 89 is activated. If text is entered from the keyboard 6, the entered text is displayed on the print area 91A and the layout 91 is displayed by changing its length to the printing length of the text that was entered. The user can thus start entering the text simply by clicking the print area 91A with the mouse 7 at the time of activating the layout edit window 89. The user can thus easily confirm the length of the label sheet onto which the entered text is printed.

If the vertical writing switch button 98 is clicked with the mouse 7, the CPU 41 collectively rotates the respective layouts 91, 101 and outlines 92 and 102 displayed on the layout display window 90, the character string [29 mm] showing the sheet width and text [Auto] showing that the free length print mode is set clockwise by 90 degrees. Thus, a user can easily find out whether the label data such as text is vertical writing or horizontal writing based on the position of the character string [29 mm] showing the sheet width and the direction of the outlines 92 and 102. The user can thus find out at a first glance the width dimension of the non-fixed length rolled sheet 12A, from the character string [29 mm] showing the sheet width. At the same time, the user can find out at a first glance, the conveying direction of the layouts 91 and 101.

If the vertical writing setting button 98 is clicked with the mouse 7, the CPU 41 collectively rotates the layout 105 displayed on the layout display window 90, and the character string [38 mm×90 mm] showing the sheet width and the length of the die cut label in the conveying direction clockwise by 90 degrees. Thus, a user can easily find out whether the label data such as text is vertical writing or horizontal writing based on the position of the character string [38 mm×90 mm] showing the sheet width and the length of the die cut label in the conveying direction. The user can thus find out at a first glance the dimensions of the die cut label, from the character string [38 mm×90 mm] showing the sheet width and the length of the die cut label in the conveying direction. At the same time, the user can find out at a first glance, the conveying direction of the layout 105.

While the presently exemplary embodiment has been shown and described, it is to be understood that this disclosure is for the purpose of illustration and that various changes and modification may be made without departing from the scope of the disclosure as set forth in the appended claims.

What is claimed is:

1. A label data creating apparatus comprising:

a display having a display screen;

a layout display unit that displays a layout of a long print medium onto which print data will be printed, on the display screen of the display, in a vertical direction or horizontal direction corresponding to a vertical writing or horizontal writing of label data to be printed on the print medium;

a size display unit that displays a size of the print medium at an exterior side of a tip edge portion of the layout in a conveying direction;

a print area setting unit that sets a print area of the print medium to a free length or fixed length, if the print medium is a non-fixed length rolled sheet; and an input device that is used in inputting the label data;

wherein:

the layout display unit also comprises: an outline display unit that displays a layout of the print medium, the layout having a predetermined length, before label data is entered, and at the same time displays a free length outline corresponding to a maximum free length, at a rear side of the layout in a conveying direction, if the print medium is a non-fixed length rolled sheet; and a free length setting display unit that displays a free length setting notice indicating the case that the print area is set to a free length.

2. The label data creating apparatus according to claim 1, wherein the free length setting display unit displays the free length setting notice in a vicinity of a rear edge portion of the layout in a conveying direction.

3. The label data creating apparatus according to the claim 1, wherein the outline display unit changes a display state of the free length outline between the case that the print area is set to a free length and the case that the print area is set to a fixed length.

4. The label data creating apparatus according to claim 1, wherein, if the print area is set to a free length, the outline display unit sets the predetermined length to a length at which label data including a plurality of characters can be inputted in a conveying direction and, if the label data has been entered, displays the layout by changing its length to a printing length of the label data thus entered.

5. The label data creating apparatus according to claim 1, wherein: the outline display unit sets the predetermined length to a fixed length if the print area is set to a fixed length; and the free length setting display unit does not display the free length setting notice if the print area is set to a fixed length.

6. The label data creating apparatus according to claim 1, wherein, if the print medium is a non-fixed length rolled' sheet, the size display unit displays a width dimension of the non-fixed length rolled sheet as said size.

7. The label data creating apparatus according to claim 1, wherein, if the print medium is a die cut, the size display unit displays a width dimension and a length dimension of the die cut as said size.

8. A label data creating method comprising:

a layout display step of displaying a layout of a long print medium onto which print data will be printed, on a display screen of a display, in a vertical direction or horizontal direction corresponding to a vertical writing or horizontal writing of label data to be printed on the print medium;

a size display step of displaying a size of the print medium at an exterior side of a tip edge portion of the layout displayed in said layout display step in a conveying direction thereof, and in parallel with the tip edge portion;

a print area setting step of setting a print area of the print medium to a free length or fixed length, if the print medium is a non-fixed length rolled sheet: and an input step of inputting the label data through an input device;

wherein:

the layout display step also comprises:

an outline display step of displaying a layout of the print medium having a predetermined length, before label data is inputted in said input step, and at the same time displaying a free length outline corresponding to a maximum free length, at a rear side of the layout in a conveying direction, if the print medium is a non-fixed length rolled sheet; and a free length setting display step of displaying a free length setting notice indicating the case that the print area is set to a free length.

9. The label data creating method according to claim 8, wherein in said free length setting display step, the free length setting notice is displayed in a vicinity of a rear edge portion of the layout in a conveying direction.

10. The label data creating method according to the claim 8, wherein in said outline display step, a display state of the free length outline is changed between the case that the print area is set to a free length and the case that the print area is set to a fixed length.

11. The label data creating method according to claim 8, wherein in said outline display step, if the print area is set to a free length, said predetermined length is set to a length at which label data including a plurality of characters can be inputted in a conveying direction; and if the label data has been entered, the layout is displayed by changing its length to a printing length of the label data thus entered.

12. The label data creating method according to claim 8, wherein: in said outline display step, the predetermined length is set to a fixed length if the print area is set to a fixed length; and in said free length setting display step, the free length setting notice is not displayed if the print area is set to a fixed length.

13. The label data creating method according to claim 8, wherein in said size display step, if the print medium is a non-fixed length rolled sheet a width dimension of the non-fixed length rolled sheet is displayed as said size.

14. The label data creating method according to claim 8, wherein in said size display step, if the print medium is a die cut, a width dimension and a length dimension of the die cut is displayed as said size.

15. A non-transitory computer program product used and executed by a label data creating apparatus comprising:

a computer readable recording medium; and a computer program stored in the computer readable recording medium, wherein the computer program includes: a layout display step of displaying a layout of a long print medium onto which print data will be printed, on a display screen of a display, in a vertical direction or horizontal direction corresponding to a vertical writing or horizontal writing of label data to be printed on the print medium;

a size display step of displaying a size of the print medium at an exterior side of a tip edge portion of the layout displayed in said layout display step in a conveying direction thereof, and in parallel with the tip edge portion;

a print area setting step of setting a print area of the print medium to a free length or fixed length, if the print medium is a non-fixed length rolled sheet; and an input step of inputting the label data through an input device;

wherein:

the layout display step also comprises:

an outline display step of displaying a layout of the print medium having a predetermined length, before label data is inputted in said input step, and at the same time displaying a free length outline corresponding to a maximum free length, at a rear side of the layout in a conveying direction, if the print medium is a non-fixed length rolled sheet; and a free length setting display step of displaying a free length setting notice indicating the case that the print area is set to a free length.

16. The non-transitory computer program product according to claim 15, wherein in said free length setting display step, the free length setting notice is displayed in a vicinity of a rear edge portion of the layout in a conveying direction.

17. The non-transitory computer program product according to claim 15, wherein in said outline display step, a display state of the free length outline is changed between the case that the print area is set to a free length and the case that the print area is set to a fixed length.

18. The non-transitory computer program product according to claim 15, wherein in said outline display step, if the print area is set to a free length, said predetermined length is set to a length at which label data including a plurality of characters can be inputted in a conveying direction; and if the label data has been entered, the layout is displayed by changing its length to a printing length of the label data thus entered.

19. The non-transitory computer program product according to claim 15, wherein: in said outline display step, the predetermined length is set to a fixed length if the print area is set to a fixed length; and in said free length setting display step, the free length setting notice is not displayed if the print area is set to a fixed length.

20. The non-transitory computer program product according to claim 15, wherein in said size display step, if the print medium is a non-fixed length rolled sheet a width dimension of the non-fixed length rolled sheet is displayed as said size.

21. The non-transitory computer program product according to claim 15, wherein in said size display step, if the print medium is a die cut, a width dimension and a length dimension of the die cut is displayed as said size.

* * * * *